(12) United States Patent
Zhang et al.

(10) Patent No.: US 10,782,841 B2
(45) Date of Patent: Sep. 22, 2020

(54) DISPLAY PANEL AND DISPLAY DEVICE

(71) Applicant: WuHan TianMa Micro-Electronics Co., Ltd., Wuhan (CN)

(72) Inventors: Guofeng Zhang, Wuhan (CN); Hong Ding, Shanghai (CN); Qijun Yao, Shanghai (CN)

( * ) Notice: Subject to any disclaimer, the term of this patent is extended or adjusted under 35 U.S.C. 154(b) by 0 days.

(21) Appl. No.: 16/716,447

(22) Filed: Dec. 16, 2019

(65) Prior Publication Data
US 2020/0117313 A1    Apr. 16, 2020

(30) Foreign Application Priority Data
Jun. 5, 2019   (CN) .......................... 2019 1 0488197

(51) Int. Cl.
*G06F 3/042*     (2006.01)
*G06F 3/044*     (2006.01)

(52) U.S. Cl.
CPC .. *G06F 3/0446* (2019.05); *G06F 2203/04107* (2013.01)

(58) Field of Classification Search
CPC ....... G06F 2203/04107; G06F 3/04164; G06F 3/0446
See application file for complete search history.

(56) References Cited

U.S. PATENT DOCUMENTS

2014/0055685 A1*   2/2014   Wang .................... G06F 3/0443
                                                                    349/12
2018/0239457 A1*   8/2018   He ........................ G06F 3/0446

FOREIGN PATENT DOCUMENTS

| CN | 106990878 A | 7/2017 |
| CN | 107894862 A | 4/2018 |
| CN | 108628497 A | 10/2018 |

* cited by examiner

*Primary Examiner* — Insa Sadio
(74) *Attorney, Agent, or Firm* — Kilpatrick Townsend & Stockton, LLP

(57) ABSTRACT

Provided are a touch display panel and a display device. The touch display panel includes a first touch electrode, a second touch electrode, a shielding signal line, and a driving chip. The first touch electrode and the driving chip are electrically connected by a first electrode line. The first electrode line includes at least one part located in a first non-display region of the touch display panel. The second touch electrode includes a first touch sub-electrode and a second touch sub-electrode, which are connected by a first connection line. The first connection line includes at least one part located in the first non-display region. The shielding signal line includes at least one part located in the first non-display region. In the first non-display region, the first electrode line and the first connection line are isolated by the shielding signal line.

20 Claims, 15 Drawing Sheets

DISPLAY PANEL AND DISPLAY DEVICE

FIELD

This application claims priority to Chinese patent application No. 201910488197.0 filed on Jun. 5, 2019, the disclosure of which is incorporated herein by reference in its entirety.

BACKGROUND

With the development of science and technology, a display panel with a touch function is widely applied to intelligent electronic devices such as a mobile phone, a television, a wearable device and a public inquiry device, so that the intelligent electronic devices are able to achieve a human-computer interaction function in a simple and convenient manner.

The touch display panel is provided with a plurality of touch driving electrodes and a plurality of touch sensing electrodes. A driving chip provide a low-voltage high-frequency signal for the touch driving electrode, and the low-voltage high-frequency signal is transmitted to the touch sensing electrode through the touch driving electrode, so that stable capacitance is formed between the touch driving electrode and the touch sensing electrode. When a user directly or indirectly touches the touch display panel, the capacitance between the touch driving electrode and the touch sensing electrode changes, so that corresponding touch operation is achieved. When the distance between the signal line connected to the touch driving electrode and the signal line connected to the touch sensing electrode is small, an coupling effect is generated between the signal lines, so that signals transmitted on the signal lines are interfered with each other, and the touch precision and the touch sensitivity are reduced.

SUMMARY

A touch display panel and a display device are provided according to the embodiments of the present disclosure, so that signal interference between signal lines is reduced, and the touch detection precision and the touch sensitivity are improved.

In one embodiment, a touch display panel is provided according to an embodiment of the present disclosure. The panel includes a display region and a non-display region surrounding the display region, a notch, a substrate and a touch structure.

The notch located at the edge of one side of the display region and is recessed towards the inside of the display region.

The touch structure is located on one side of the substrate.

The touch structure includes a plurality of first touch electrodes and a plurality of second touch electrodes. The plurality of first touch electrodes extend along a first direction, and are arranged along a second direction. The plurality of second touch electrodes extend along the second direction, and are arranged along the first direction. The first direction intersects the second direction.

At least one of the plurality of second touch electrodes includes a first touch sub-electrode and a second touch sub-electrode located on two sides of the notch along the second direction.

The non-display region includes a first non-display region adjacent to the notch.

The first touch sub-electrode is connected to the second touch sub-electrode through a first connection line. At least part of the first connection line is located in the first non-display region.

The first touch electrode is electrically connected to a driving chip through a first electrode line. At least part of the first electrode line is located in the first non-display region.

The touch display panel further includes a shielding signal line. The orthographic projection of at least part of the shielding signal line located in the first non-display region onto the substrate is located between the orthographic projection of the first connection line onto the substrate, and the orthographic projection of the first electrode line onto the substrate.

In one embodiment, a display device is provided according to an embodiment of the present disclosure. The device includes the above-mentioned display panel.

A touch display panel and a display device are provided according to the embodiments of the present disclosure. The touch display panel is provided with a notch, and a first non-display region adjacent to the notch. In a first non-display region, at least part of a first electrode line electrically connected to a first touch electrode and a driving chip, and at least part of a first connection line electrically connected to a first touch sub-electrode and a second touch sub-electrode of a second touch electrode are disposed. A shielding signal line is disposed in the touch display panel; and the orthographic projection of at least part of the shielding signal line located in the first non-display region onto a substrate of the touch display panel are located between the orthographic projection of the first electrode line onto the substrate, and the orthographic projection of the first connection line onto the substrate. In this way, in the first non-display region, the shielding signal line is used to isolate the first electrode line from the first connection line to reduce the coupling effect between the first electrode line and the first connection line.

DETAILED DESCRIPTION

Figure 1:
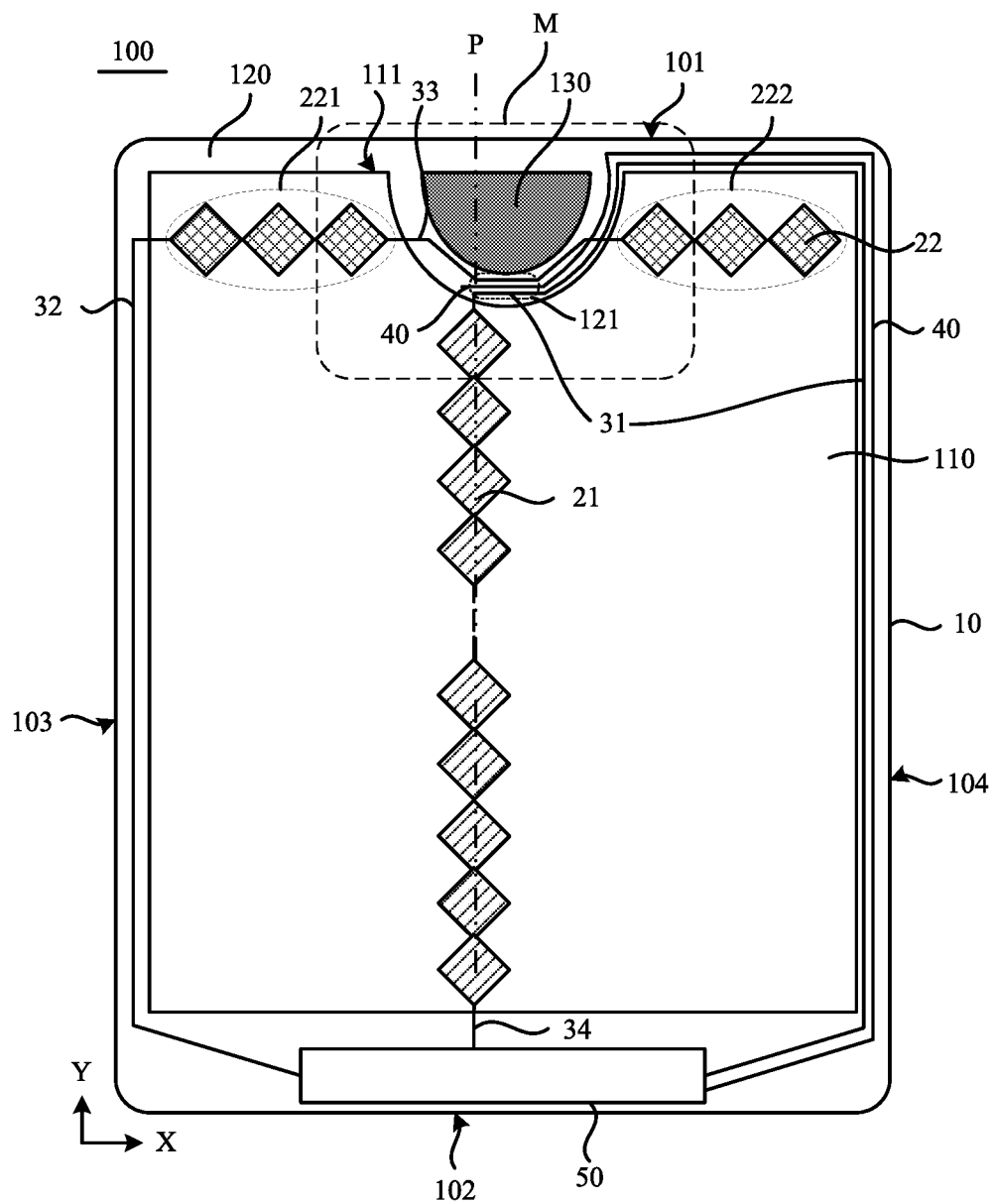
FIG. 1 is a top view of a touch display panel according to an embodiment of the present disclosure.

Hereinafter the present disclosure will be further described in detail in conjunction with the drawings and embodiments. It is to be understood that the embodiments set forth below are intended to illustrate and not to limit the present disclosure. Additionally, it is to be noted that, for ease of description, only part, not all, of the structures related to the present disclosure are illustrated in the drawings.

The inventor finds that a functional module (such as a camera, an infrared sensor and the like) having a requirement for light transmission is generally disposed in a display region of a touch display panel with a narrow bezel and a high screen-to-body ratio, so that a notch exists in the display region of the touch display panel. In this case, touch electrodes and the like on two sides of the notch need to be electrically connected together through a corresponding connection line to ensure the display and touch functions of the touch display panel having the notch.

The touch display panel includes a touch structure. The touch structure includes a plurality of touch sensing electrodes and a plurality of touch driving electrodes intersecting the plurality of touch sensing electrodes. The plurality of touch sensing electrodes are arranged along a first direction and extend along a second direction. The plurality of touch driving electrodes are arranged along the second direction and extend along the first direction. Generally, the touch principle of the touch display panel is that: the touch driving electrode receives a touch driving voltage signal, so that stable capacitance is formed between the touch driving electrode and the touch sensing electrode; and when a finger or a stylus touches the touch surface of the touch display panel, the capacitance between the touch driving electrode and the touch sensing electrode at the corresponding position changes. The touch position is determined and the touch function is achieved through a detection of the capacitance between the touch driving electrode and the touch sensing electrode at the corresponding position, that is, a touch sensing voltage signal.

In a touch operation, the capacitance between the touch driving electrode and the touch sensing electrode changes, so that a signal transmitted through the touch driving electrode, and a signal transmitted through the touch sensing electrode are not constant potentials, and an unstable coupling effect is generated between a line conveying the touch driving voltage signal and a line conveying the touch sensing voltage signal. The smaller the distance between the lines, the more apparent the unstable coupling effect. The unstable coupling effect influences the touch precision and sensitivity.

Embodiments of the present disclosure, a touch display panel is provided. The touch display panel includes a display region and a non-display region surrounding the display region.

The touch display panel further has a notch located at one edge of the display region and extending towards the inside of the display region.

The touch display panel includes a substrate and a touch structure. The touch structure is located on one side of the substrate. The touch structure includes a plurality of first touch electrodes and a plurality of second touch electrodes. The plurality of first touch electrodes extend along a first direction and are arranged along a second direction, the plurality of second touch electrodes extend along the second direction and are arranged along the first direction, and the first direction intersects the second direction. At least one of the plurality of second touch electrodes includes a first touch sub-electrode and a second touch sub-electrode located on two sides of the notch along the second direction. The non-display region includes a first non-display region adjacent to the notch. The first touch sub-electrode and the second touch sub-electrode are connected by a first connection line. At least one part of the first connection line is in the first non-display region. The first touch electrode is electrically connected to a driving chip through a first electrode line, and at least one part of the first electrode line is located in the first non-display region. The touch display panel further includes a shielding signal line. The shielding signal line has a part in the first non-display region, and an orthographic projection of this part onto the substrate is located between an orthographic projection of the first connection line onto the substrate and an orthographic projection of the first electrode line onto the substrate.

In one embodiment, the shielding signal line is disposed in the touch display panel, where the orthographic projection of the part of the shielding signal line located in the first non-display region onto the substrate is located between the orthographic projection of the first electrode line onto the substrate and the orthographic projection of the first connection line onto the substrate. In this way, in the first non-display region, the shielding signal line is used to isolate the first electrode line from the first connection line to reduce the coupling effect between the first electrode line and the first connection line, so that the mutual interference effect between a signal transmitted on the first electrode line and a signal transmitted on the first connection line is reduced, and the touch detection precision and the touch sensitivity are improved. In another embodiment, since the first electrode line, first connection line and other touch lines are adjacent to the notch, the line density is relatively large, so that the interference effect between signals transmitted on touch signal lines is larger than the interference effect in other regions. With the shielding signal line disposed adjacent to the notch, the mutual interference effect between the signal transmitted on the first electrode line and the signal transmitted on the first connection line is reduced, and the influence of signal interference due to the dense lines adjacent to the notch is reduced. Meanwhile, the shielding signal line is disposed adjacent to the notch, so that the shielding signal line can be protected in some degree; and the notch extends from the edge of the display region towards the inside of the display region, so the arrangement in which the shielding signal line is located in the non-display region adjacent to the notch means that the shielding signal line is located in the preceding notch region, so that the line breaking risk of the shielding signal line is smaller compared with lines in other regions.

It should be noted that the substrate of the touch display panel provided in the embodiment of the present disclosure may be a flexible substrate or a rigid substrate, and a corresponding functional film, such as a thin film transistor array film, an optical film, an encapsulation film and the like, may be further disposed between the substrate and the touch structure; and the substrate may also represent another layer of the touch display panel except the touch structure, which is not specially limited in the embodiment of the present disclosure.

In an embodiment of the present disclosure, the plurality of first touch electrodes and the plurality of second touch electrodes of the touch structure in the touch display panel may be block electrodes, strip electrodes or the like. The first touch electrode may be the touch driving electrode and the second touch electrode may be the touch sensing electrode; the first touch electrode may be the touch sensing electrode and the second touch electrode may be the touch driving electrode, which are not specifically limited in the embodiment of the present disclosure. In addition, the notch of the touch display panel may be circular, square, semi-circular or the like, which is also not specially limited in the embodiment of the present disclosure. The following describes an example in which the notch is in a semi-circular shape.

Figure 2:
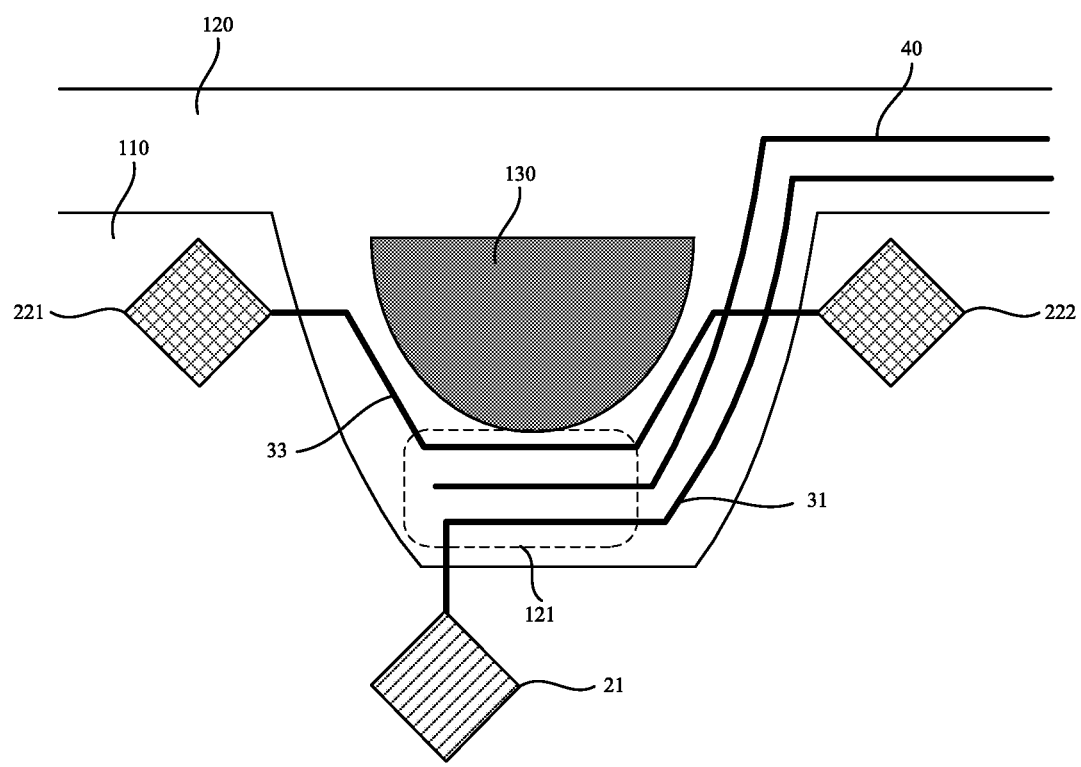
FIG. 2 is an enlarged view of a region M in FIG. 1.

FIG. 1a is a top view of a touch display panel according to an embodiment of the present disclosure. FIG. 2 is an enlarged view of a region M of FIG. 1. According to FIG. 1 and FIG. 2, the touch display panel includes a display region 110 and a non-display region 120 surrounding the display region 110, and a notch 130 extending from the edge 111 of the display region 110 of the touch display panel 100 towards the inside of the display region. It should be noted that the notch 130 may be used for disposing a camera, a photoelectric sensor, and the like, so that the function of the display panel is enriched. The notch 130 is different from the display region. The notch does not have a light-emitting material layer and thus does not have a display function. The notch does not influence the shape of the bezel of the display panel. Meanwhile, the notch may also be a groove, that is, the notch is a hollowed-out structure of the substrate, and does not have any film. In other words, one edge of the display area is recessed inwardly towards the inside of the display region, and at the same time the display panel bezel adjacent to the edge of the display region is also recessed inwardly towards the inside of the display region, so that the notch is formed. In embodiments of the present disclosure, the notch is described using an example in which the notch does not have a light-emitting material layer and thus does not have a display function, and where the notch does not influence the shape of the display panel bezel. However, the present disclosure is not limited thereto. The non-display region 120 includes a first non-display region 121 adjacent to the notch 130. The non-display region adjacent to the notch is between the display region and the notch, that is, the first non-display region is close to both the display region and the notch, and located between the display region and the notch. The touch display panel 100 includes a substrate 10, and a touch structure located on one side of the substrate 10. The touch structure includes a plurality of first touch electrodes 21 and a plurality of second touch electrodes 22. The plurality of second touch electrodes 22 are arranged along a first direction Y, and the plurality of first touch electrodes 21 are arranged along a second direction X. Each of the plurality of first touch electrodes 21 extends along the first direction Y, and each of the plurality of second touch electrodes extends along the second direction X, where the first direction Y intersects the second direction X. In this way, the first touch electrodes 21 intersect the second touch electrodes 22 to form a mutual-capacitive touch structure.

Each of the plurality of first touch electrodes 21 is electrically connected to a driving chip 50 through a first electrode line 31, so that signals can be transmitted between the first touch electrodes 21 and the driving chip 50. The first touch electrodes 21 extend along the first direction Y, and the driving chip 50 is disposed in the non-display region 120 close to a first edge 102 of the touch display panel 100. When a signal is transmitted from the driving chip 50 to the first touch electrode 21 only through a second electrode line 34 close to the first edge 102 of the touch display panel 100, signal loss occurs on the first touch electrode 21, so that the signal received by the part of the first touch electrode 21 close to the second edge 101 of the touch display panel 100 and the signal received by the part of the first touch electrode 21 close to the first edge 102 of the touch display panel 100 are different. Therefore, the first electrode line 31 and the second electrode line 34 are generally disposed in the touch display panel 100. The part of the first touch electrodes 21 close to the second edge 101 of the touch display panel 100 is directly connected to the driving chip 50 by the first electrode line 31, and the part of the first touch electrodes 21 close to the first edge 102 of the touch display panel 100 is directly connected to the driving chip 50 by the second electrode line 34, so that the signal loss is prevented on the first touch electrode 21, and the influence on the touch accuracy and sensitivity is also prevented. The first edge 102 and the second edge 101 of the touch display panel are disposed on two opposite sides of the display region 110 along the first direction Y, where the first edge 102 is one side, close to the driving chip 50, of the touch display panel, and the second edge 101 is one side, far away from the driving chip 50, of the touch display panel. The touch display panel further includes a third edge 103 connecting the first edge 102 and the second edge 101, and a fourth edge 104 connecting the first edge 102 and the second edge 101, and the third edge 103 and the fourth edge 104 are disposed on two opposite sides of the display region along the second direction X.

In another embodiment, other signal lines, such as a power signal line, a reset signal line and the like are disposed at the position without the notch, the non-display region close to the third edge 103 or the fourth edge 104 of the touch display panel, and each of these signal lines conveys a fixed potential signal, which protects the electrode line through the adjustment or isolation from the coupling effect between the electrode lines, that is, the coupling effect between the electrode lines in this regions is small. Therefore, if a shielding signal is disposed in this region again, then not only the coupling effect between the electrode lines is not further reduced, but also the width of the non-display region is increased, and the load of the display panel is increased. According to the present disclosure, the shielding signal line is disposed close to the notch. In one embodiment, the design of the recess toward the inside has a protection function at the position of the shielding signal line. In the other embodiments, since no signal line conveying a fixed potential exist in the non-display region adjacent to the notch which can relieve the coupling effect between the touch electrode lines in this region, the shielding signal line is disposed in the non-display region adjacent to the notch, which can not only reduce the coupling effect between the electrode lines, but also balance the difference between the coupling effect in the region adjacent to the notch of the display panel and the coupling effect in other regions of the display panel, where the non-display region adjacent to the notch is located between the display region and the notch.

Accordingly, each of the plurality of second touch electrodes 22 is electrically connected to the driving chip 50 through a third electrode line 32, so that signals can be transmitted between the second touch electrode 22 and the driving chip 50. Since the second touch electrodes 22 extend along the second direction X, and the notch 130 is located at the second edge 101 of the touch display panel 100, at least one of the plurality of second touch electrodes 22 includes a first touch sub-electrode 221 and a second touch sub-electrode 221 located on two sides of the notch 130. The first touch sub-electrode 221 is electrically connected to the second touch sub-electrode 222 through a first connection line 33, and the first connection line 33 has a part located in the first non-display region 121.

The area of the first non-display region 121 adjacent to the notch 130 is relative small, and the first non-display region is close to both the display region and the notch, and located between the display region and the notch, so the lines disposed in the first non-display region 121 are dense, so that the distance between the lines is relative small. In one embodiment, the distance between the first connection line 33 and the first electrode line 31 located in the first non-display region 121 is relative small, and the coupling effect between the first electrode line 31 and the first connection line 33 is relative large, and a signal transmitted on the first electrode line 31 and a signal transmitted on the first connection line 33 interfere with each other.

The shielding signal line 40 is disposed in the touch display panel 100, and the orthographic projection of at least one part of the shielding signal line 40 located in the first non-display region 121 onto the substrate 10 of the touch display panel 100 is located between the orthographic projection of the first electrode line 31 onto the substrate 10 and the orthographic projection of the first connection line 33 onto the substrate 10. In this way, in the first non-display region 121, the shielding signal line 40 is used to isolate the first electrode line 31 from the first connection line 33 to reduce the coupling effect between the first electrode line 31 and the first connection line 33, so that the mutual interference effect between the signal transmitted on the first electrode line 31 and the signal transmitted on the first connection line 33 is reduced, and the touch detection precision and the touch sensitivity are improved.

It should be noted that FIG. 1 is just an exemplary drawing according to an embodiment of the present disclosure. The first touch electrode 21 in FIG. 1 includes a plurality of first touch electrode blocks, and the second touch electrode 22 includes a plurality of second touch electrode blocks, that is, both the first touch electrode 21 and the second touch electrode 22 may be block electrodes connected in series. The plurality of first touch electrode blocks may be disposed in the same layer as the plurality of second touch electrode blocks. The first touch electrode blocks of the same first touch electrode 21 are electrically connected through a corresponding first touch line, and the second touch electrode blocks of the same second touch electrode 22 are electrically connected through a corresponding second touch line. A bridge structure is formed at the crossing position of the first touch line and the second touch line, so that the first touch line is electrically insulated from the second touch line.

Figure 3:
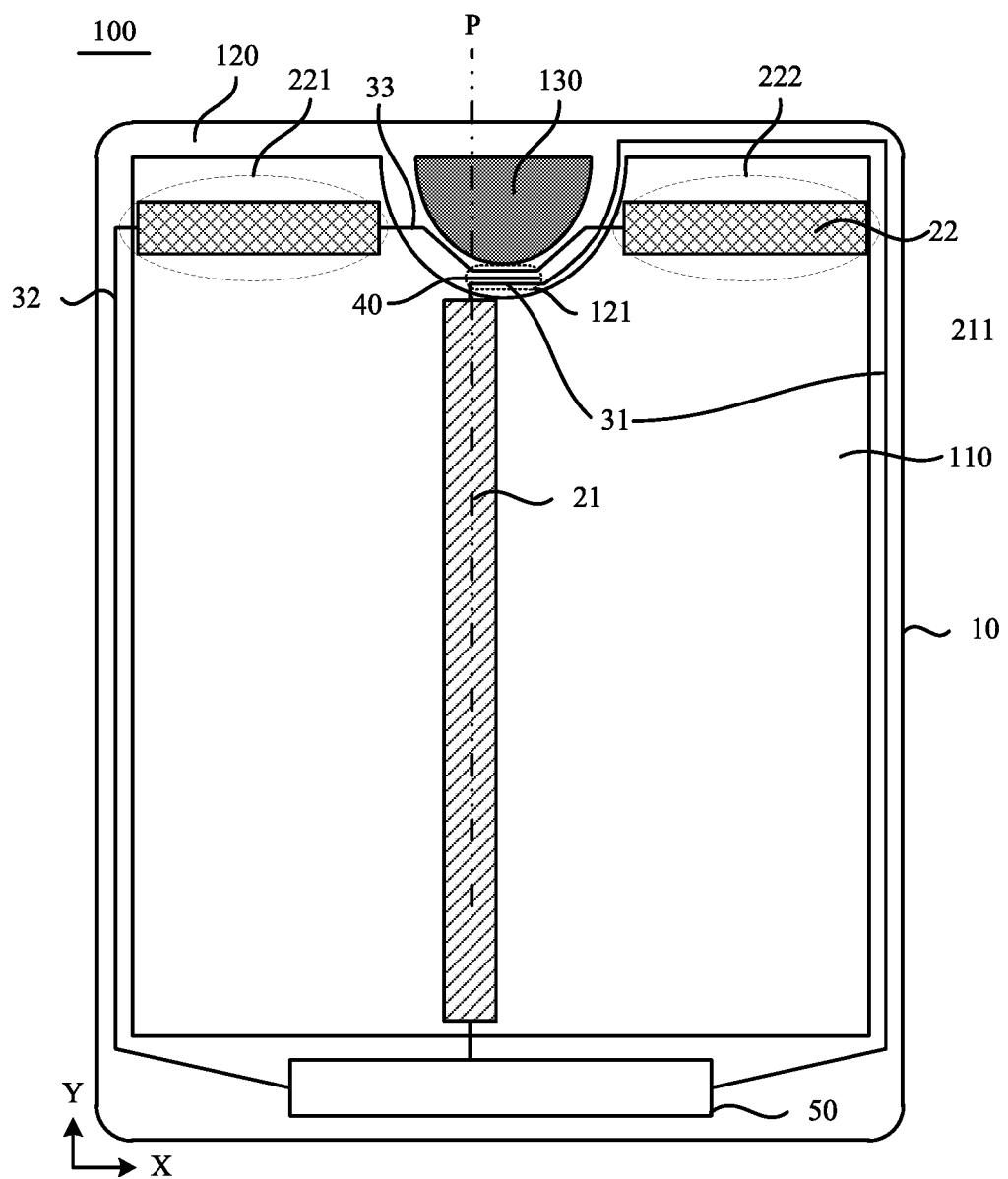
FIG. 3 is a top view of another touch display panel according to an embodiment of the present disclosure.

In addition, exemplarily, FIG. 3 is a schematic view of another touch display panel according to an embodiment of the present disclosure. The same parts between FIG. 3 and FIG. 1 will not be repeated here, and only the differences between FIG. 1 and FIG. 2 are described. As shown in FIG. 3, both the first touch electrode 21 and the second touch electrode 22 may be strip touch electrodes. The strip first touch electrode 21 and the strip second touch electrode 22 may be disposed in different layers, and the orthographic projection of the first touch electrode 21 onto the substrate 10 overlaps the orthographic projection of at least one part of the second touch electrode 22 onto the substrate 10. Stable capacitance is formed at the overlapping position between the first touch electrode 21 and the second touch electrode 22. When a finger or a stylus touches the touch surface of the touch display panel 100, the capacitance at the corresponding position changes, so that the touch position is detected.

Accordingly, the notch 130 of the touch display panel 100 divides at least one strip second touch electrode 22 into the first touch sub-electrode 221 and the second touch sub-electrode 222. The first touch sub-electrode 221 needs to be electrically connected to the second touch sub-electrode 222 through the first connection line 33, and the first connection line 33 has one part located in the first non-display region of the touch display panel 100. Similarly, the strip first touch electrode 21 is electrically connected to the driving chip 50 through the first electrode line 31 and the second electrode line 32. The first electrode line 31 has a part located in the first non-display region 121, so that the distance between the first connection line 33 and the first electrode line 31 located in the first non-display region 121 is relative small, and the coupling effect easily occurs.

The shielding signal line 40 is disposed in the touch display panel 100, and the orthographic projection of the part of the shielding signal line 40 located in the first non-display region 121 onto the substrate 10 of the touch display panel 100 is located between the orthographic projection of the first electrode line 31 onto the substrate 10 and the orthographic projection of the first connection line 33 onto the substrate 10. In this way, in the first non-display region 121, the first electrode line 31 is isolated from the first connection line 33, so that the coupling effect between the first electrode line 31 and the first connection line 33 is reduced. As a result, the mutual interference effect between the signal transmitted on the first electrode line 31 and the signal transmitted on the first connection line 33 is reduced, and the touch detection precision and the touch sensitivity are improved.

It should be noted that FIG. 1 and FIG. 3 are just exemplary drawings according to the embodiments of the present disclosure. In addition to the block and strip, the touch structure may be in another shape, which is not specially limited in the embodiments of the present disclosure.

In addition, in the embodiment of the present disclosure, when the orthographic projection of the part of the shielding signal line 40 located in the first non-display region 121 onto the substrate 10 of the touch display panel 100 is located between the orthographic projection of the first electrode line 31 onto the substrate 10 and the orthographic projection of the first connection line 33 onto the substrate 10, the beneficial effect of improving the touch detection precision and the touch sensitivity can be achieved. The shape of the first touch electrode and the shape of the second touch electrode are not specially limited in the embodiment of the present disclosure. Meanwhile, in the embodiments described below, the description related to the top view of the touch display panel is made with the example of the touch structure shown in FIG. 1.

In one embodiment, with continued reference to FIG. 1 and FIG. 2, the shielding signal line 40 may receive a fixed potential signal. In one embodiment, the fixed potential signal is supplied by the driver chip 50. In this manner, when the orthographic projection of the part of the shielding signal line 40 located in the first non-display region 121 onto the substrate 10 of the touch display panel 100 is located between the first electrode line 31 and the first connection line 33, the first electrode line 31 can be isolated from the first connection line 33. Moreover, due to the fixed potential signal on the shielding signal line, a stable coupling effect can be generated both between the shielding signal line 40 and the first electrode line 31, and between the shielding signal line 40 and the first connection line 33. That is, a fixed potential is added between the first electrode line 31 and the first connection line 33 which make up the coupling capacitor, and the coupling effect of the fixed potential signal to the first electrode line 31 and the first connection line 33 is fixed. Therefore, signals can be transmitted on the first electrode line 31 and the first connection line 33 stably.

Exemplarily, the fixed potential signal on the shielding signal line 40 may be a high potential signal, which is much higher than the potential of the signal transmitted on the first electrode line 31 and the potential of the signal transmitted on the first connection line 33. In this case, the shielding signal line 40 isolates the first electrode line 31 from the first connection line 33; and both the coupling effect between the shielding signal line and the first electrode line 31, and the coupling effect between the shielding signal line and the first connection line 33 are relative large. That is, a potential much higher than potentials of the first electrode line 31 and the first connection line 33 is added between the first electrode line 31 and the first connection line 33 which make up the coupling capacitor. Therefore, when the signal transmitted on the first electrode line 31 changes, the change in the coupling effect between the first electrode line 31 and the shielding signal line 40 is negligible; and/or when the signal transmitted on the first connection line 33 changes, the change in the coupling effect between the first connection line 33 and the shielding signal line 40 is negligible; and accordingly, the signals can be transmitted on the first electrode line 31 and the first connection line 33 stably.

Exemplarily, the fixed potential signal on the shielding signal line 40 may be 0V. In this case, both the coupling effect between the shielding signal line 40 and the first electrode line 31, and the coupling effect between the shielding signal line 40 and the first connection line 33 are relative small; and the shielding signal line 40 may equivalent to be an isolation line between the first electrode line 31 and the first connection line 33. That is, a potential lower than the potentials of the first electrode line 31 and the first connection line 33 is added between the first electrode line 31 and the first connection line 33. Therefore, one coupling capacitance is generated between the shielding signal line 40 and the first electrode line 31, and another coupling capacitance is generated between the shielding signal line 40 and the first connection line 33. The coupling capacitance is smaller than the capacitance between the first electrode line 31 and the first connection line 33 in the case where the shielding signal line 40 is not arranged, and is negligible. Accordingly, the signals can be transmitted on the first electrode line 31 and the first connection line 33 stably.

Figure 4:
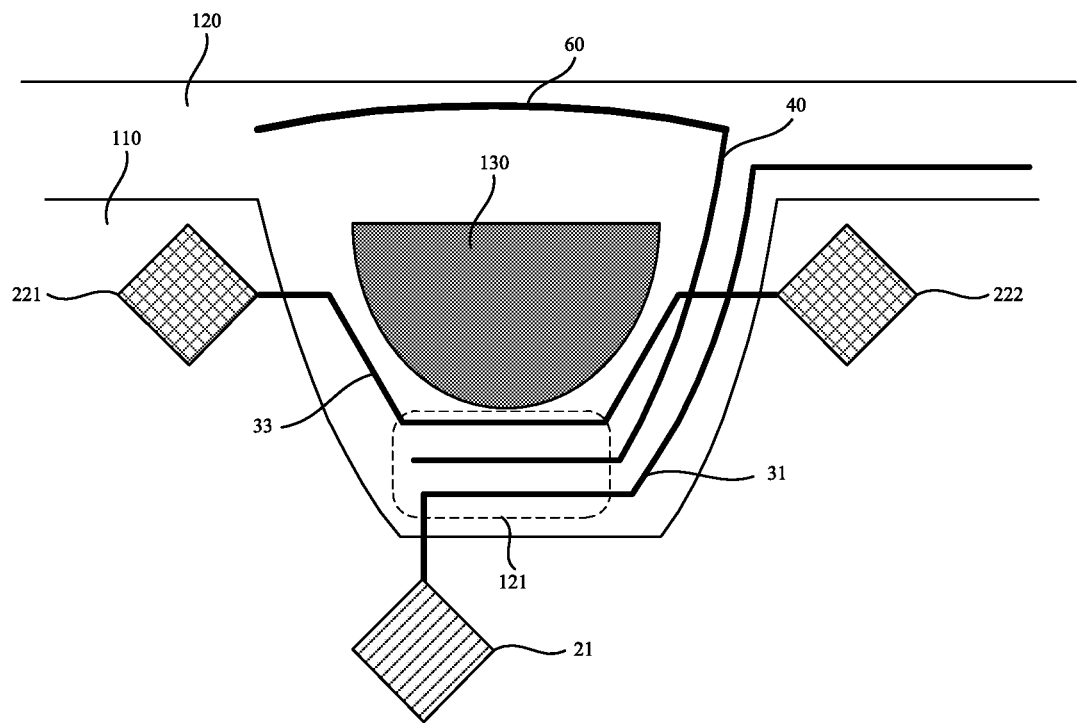
FIG. 4 is an enlarged view of a partial region in a touch display panel according to an embodiment of the present disclosure.

In addition, FIG. 4 is a schematic view showing the structure of a partial region in a touch display panel according to an embodiment of the present disclosure. As shown in FIG. 4, the shielding signal line 40 may be electrically connected to a ground line 60 disposed in the non-display region 120 of the touch display panel, so that the potential on the shielding signal line 40 is fixed to a ground potential. Since the ground potential is generally 0 V, the potential on the shielding signal line 40 is fixed to0 V.

In one embodiment, as in FIG. 1, the touch structure includes the plurality of first touch electrodes 21, which extend along the first direction Y, and are arranged along the second direction X. When the notch 130 is located adjacent to the second edge 101 of the touch display panel 100 and the length of the notch 130 is smaller than that of the touch display panel 100 along the first direction X, the first electrode lines 31 of part of the first touch electrodes 21 need to be disposed in the first non-display region 121, and the first electrode lines 31 of other first touch electrodes 21 may be disposed in the non-display region adjacent to the second edge 101 of the touch display panel 100, so that the first touch electrode 21 close to the second edge 101 of the touch display panel 100 can be directly electrically connected to the driving chip 50 through the first electrode line 31. The first touch electrode 21 is located on a straight line P extending through the notch 130, and is electrically connected to the first electrode line 31 located in the first non-display region.

In one embodiment, with continued reference to FIG. 1 and FIG. 2, in the first non-display region, the orthographic projection of the first connection line 33 onto the substrate 10 does not overlap the orthographic projection of the first electrode line 31 onto the substrate 10. The first electrode line 31 and the first connection line 33 in the first non-display region 121 may be disposed in the same layer or disposed in different layers. In the first non-display region 121, the first electrode line 31 and the first connection line 33 disposed in the same layer or disposed in the different layers are insulated from each other, so that signal crosstalk can be prevented.

The case where the first connection line and the first electrode line are disposed in the same layer in the first non-display region is exemplarily described below in conjunction with the drawings.

Figure 5:
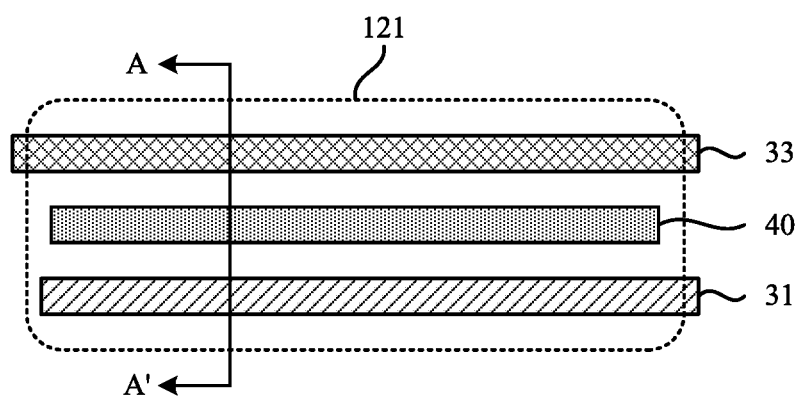
FIG. 5 is a top view of a first non-display region according to an embodiment of the present disclosure.
Figure 6:
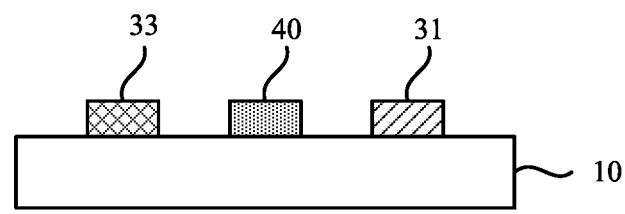
FIG. 6 is a sectional view taken along line A-A' in FIG. 5.

FIG. 5 is a top view showing the structure of the first non-display region according to an embodiment of the present disclosure. FIG. 6 is a sectional view of the touch display panel taken along section line A-A' in FIG. 5. On the basis of the above-mentioned embodiment, according to FIG. 5 and FIG. 6, in the first non-display region 121, the first electrode line 31 and the first connection line 33 do not overlap and are disposed in the same layer; and at least part of the shielding signal line 40 located in the first non-display region 121 is located between the first connection line 33 and the first electrode line 31.

In the first non-display region 121, when the at least part of the shielding signal line 40 is disposed in the same layer as the first electrode line 31 and the first connection line 33, the at least part of the shielding signal line 40, the first electrode line 31 and the first connection line 33 located in the first non-display region 121 can be made of the same material in the same process. Therefore, part of process steps can be simplified, the cost can be reduced, the number of films of the touch structure in the touch display panel can be reduced, so that the touch display panel can be light and thin. Meanwhile, in the first non-display region 121, the at least part of the shielding signal line 40 is located between the first connection line 33 and the first electrode line 31, so that the first electrode line 31 can be isolated from the first connection line 33 in the first non-display region 121 through the shielding signal line 40. Therefore, a signal transmitted on the first connection line 33 is prevented from interfering with a signal transmitted on the first electrode line 31, or a signal transmitted on the first electrode line is prevented from interfering with a signal transmitted on the first connection line 33, and the touch detection precision and the touch sensitivity are improved.

In one embodiment, the shielding signal line located in the first non-display region includes a first shielding structure, a second shielding structure and a shielding overpass. The first shielding structure is located between the first connection line and the first electrode line. The second shielding structure is located on one side, far away from the first shielding structure, of the first connection line or the first electrode line. The first shielding structure and the second shielding structure, and the first connection line and the first electrode line are disposed in the same layer. The first shielding structure and the second shielding structure are connected to each other through the shielding overpass or shielding overpasses to form a U-shaped or ring-shaped structure. The shielding overpass is disposed in a layer different from the layer where the first connection line and the first electrode line are disposed.

The case where the first electrode line and the first connection line in the first non-display region are disposed in the same layer and the shielding overpass is disposed in a different layer is exemplarily described below in conjunction with the drawings.

Figure 7:
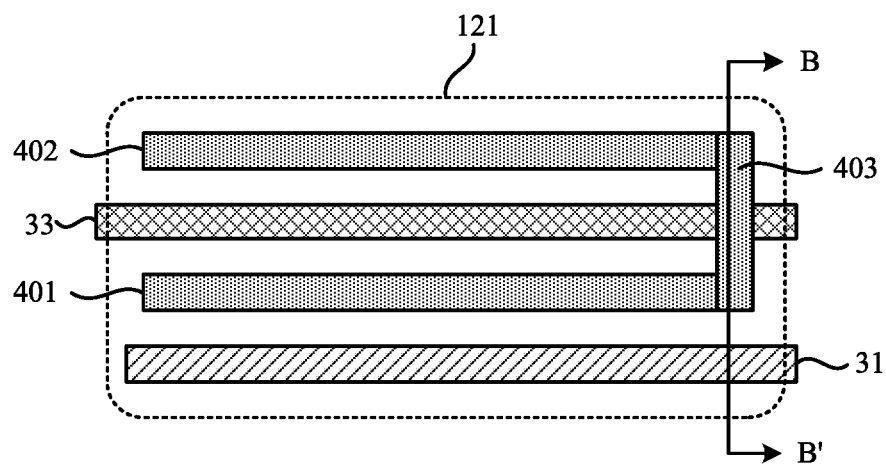
FIG. 7 is a top view of another first non-display region according to an embodiment of the present disclosure.
Figure 8:
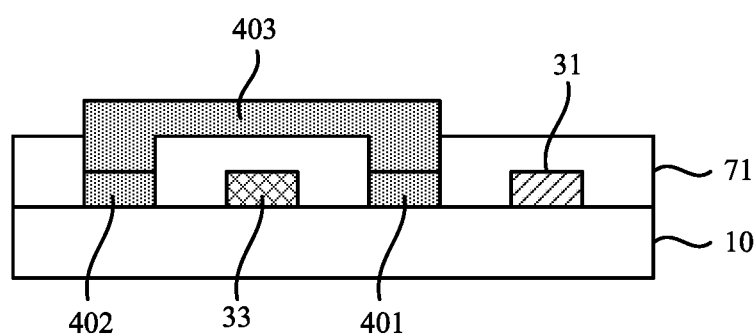
FIG. 8 is a sectional view taken along line B-B' in FIG. 7.

FIG. 7 is a top view showing the structure of another first non-display region according to an embodiment of the present disclosure. FIG. 8 is a sectional view taken along section line B-B' in FIG. 7. According to FIG. 7 and FIG. 8, the shielding signal line includes a first shielding structure 401, a second shielding structure 402 and a shielding overpass 403. The first shielding structure 401 is located between the first connection line 33 and the first electrode line 31. The second shielding structure 402 is located on one side, far away from the first shielding structure 401, of the first connection line 33. The first shielding structure 401 and the second shielding structure 402 are disposed in the same layer as the first connection line 33 and the first electrode line 31. The shielding overpass 403 is disposed in a layer different from the layer where the first connection line 33 and the first electrode line 31 are located. In one embodiment, the shielding overpass 403 is disposed in a layer above the layer where the first connection line 33 and the first electrode line 31 are located. The first shielding structure 401 and the second shielding structure 402 are connected to each other through the shielding overpass 403 to form a U-shaped structure. An insulating layer 71 may be disposed between the shielding overpass 401 and the first connection line 33, as well as between the shielding overpass 401 and the first electrode line 31. The shielding overpass 401 are connected to the first shielding structure 401 and the second shielding structure 402 through vias penetrating the insulating layer 71.

In this manner, the U-shaped shielding signal structure partially surrounds the first connection line 33, so that first electrode line 31 and the first connection line 33 in the first non-display region 121 are isolated from each other. The first shielding structure 401 and the second shielding structure 402 of the U-shaped shielding signal structure are located on two sides of the first connection line 33, so that the coupling effect between the second shielding structure 402 and the first connection line 33 is canceled through the coupling effect between the first shielding structure 401 and the first connection line 33, and therefore the stability of signal transmission on the first connection line 33 is further improved; and the touch detection precision and the touch sensitivity are improved.

Figure 9:
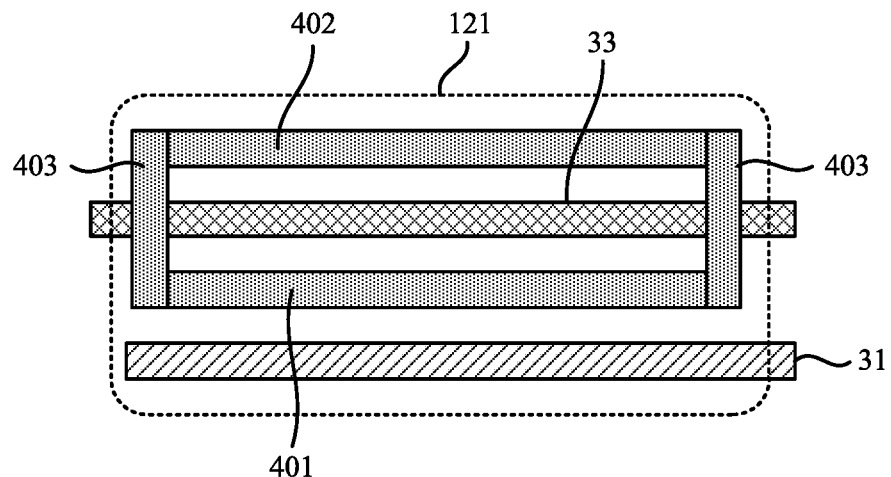
FIG. 9 is a top view of another first non-display region according to an embodiment of the present disclosure.

FIG. 9 is a top view showing the structure of another first non-display region according to an embodiment of the present disclosure. The difference between the first non-display region shown in FIG. 9 and the first non-display region shown in FIG. 7 is as follows. In the first non-display region shown in FIG. 9, the first shielding structure 401 and the second shielding structure 402 of the shielding signal line are connected to each other through the shielding overpasses 403 to form a ring-shaped structure. For the same aspects in FIG. 9 and FIG. 7, please refer to the description of FIG. 7 and FIG. 8, and no reception is made here.

In this manner, in the first non-display region 121, the ring-shaped shielding structure surrounds the first connection line 33, and provides an electrostatic shielding function, so that the first connection line 33 protected by the ring-shaped shielding structure is isolated from the first electrode line 31 and other lines. In addition, the coupling effect between the shielding signal line and the first connection line as well as the first electrode line is further reduced, so that the coupling effect between the shielding signal line and the first connection line as well as the first electrode line is negligible. In this way, the stability of signal transmission on the first connection line 33 is improved, improving the touch detection precision and the touch sensitivity.

Figure 10:
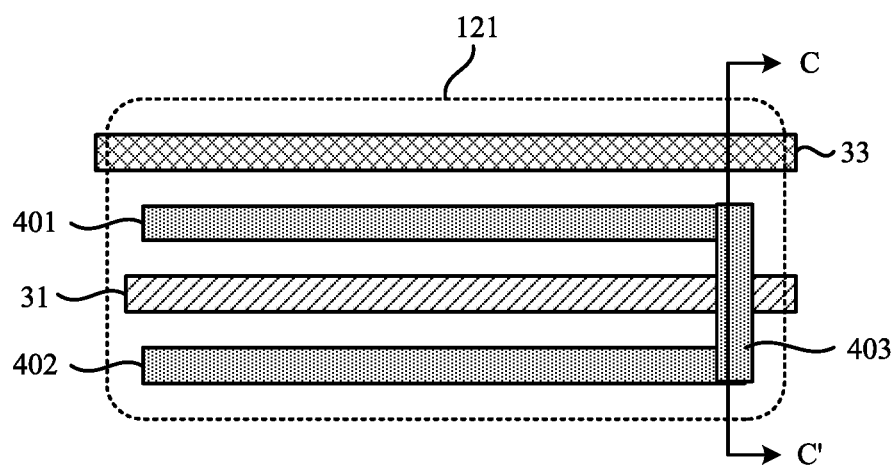
FIG. 10 is a top view showing of another first non-display region according to an embodiment of the present disclosure.
Figure 11:
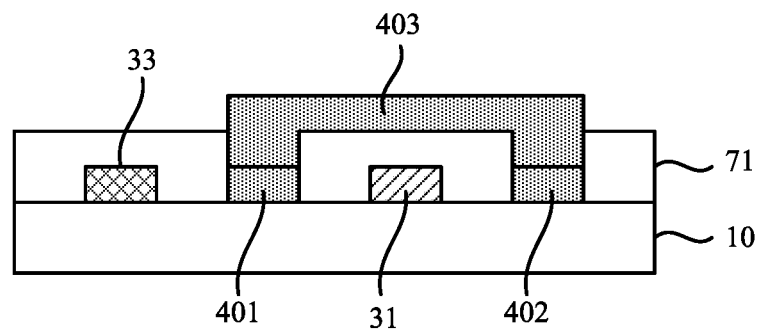
FIG. 11 is a sectional view taken along line C-C' in FIG. 10.

FIG. 10 is a top view showing the structure of another first non-display region according to an embodiment of the present disclosure. FIG. 11 is a sectional view taken along section line C-C' in FIG. 10. According to FIG. 10 and FIG. 11, the shielding signal line includes a first shielding structure 401, a second shielding structure 402 and a shielding overpass 403. The first shielding structure 401 is located between the first connection line 33 and the first electrode line 31. The second shielding structure 402 is located on one side, far away from the first shielding structure 401, of the first connection line 31. The first shielding structure 401 and the second shielding structure 402 are disposed in the same layer as the first connection line 33 and the first electrode line 31. The shielding overpass 403 is disposed in a layer different from the layer where the first connection line 33 and the first electrode line 31 are disposed. The first shielding structure 401 and the second shielding structure 402 are connected to each other through the shielding overpass 403 to form a U-shaped structure. An insulating layer 71 may be disposed between the shielding overpass 401 and the first connection line 33 as well as the first electrode line 31. The shielding overpass 401 are connected to the first shielding structure 401 and the second shielding structure 402 through vias penetrating the insulating layer 71.

In this manner, the shielding signal line of a U-shaped structure partially surrounds the first electrode line 31, so that first electrode line 31 and the first connection line 33 in the first non-display region 121 are isolated from each other. In addition, the first shielding structure 401 and the second shielding structure 402 of the U-shaped shielding signal line are located on two sides of the first electrode line 31, so that the coupling effect between the second shielding structure 402 and the electrode line 31 can be canceled through the coupling effect between the first shielding structure 401 and the first electrode line 31, and therefore the stability of signal transmission on the first electrode line 31 can be improved; and the touch detection precision and the touch sensitivity are improved.

Figure 12:
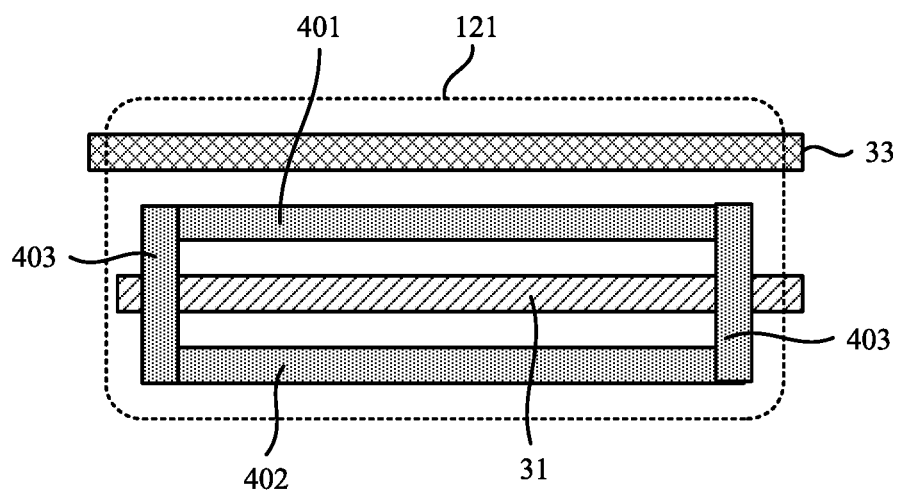
FIG. 12 is a top view of another first non-display region according to an embodiment of the present disclosure.

FIG. 12 is a top view showing the structure of another first non-display region according to an embodiment of the present disclosure. The difference between the first non-display region shown in FIG. 12 and the first non-display region shown in FIG. 10 is that the first shielding structure 401 and the second shielding structure 402 of the shielding signal line are connected to each other through the shielding overpasses 403 to form a ring-shaped structure. For the same aspects of FIG. 12 and FIG. 10, please refer to the description of FIG. 10 and FIG. 11, and no reception is made here.

In this manner, in the first non-display region 121, the shielding signal line having a ring-shaped structure surrounds the first electrode line 31, and provides an electrostatic shielding function, so that the electrode line 31 surrounded by the ring-shaped structure of the shielding signal line is isolated from the first connection line 22 and other lines. In this way, the stability of signal transmission on the electrode line 31 is improved, and the touch detection precision and the touch sensitivity are improved.

Figure 13:
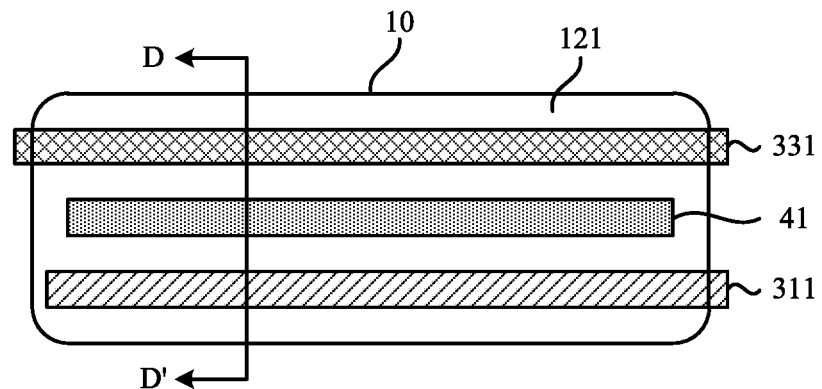
FIG. 13 is a schematic view showing a projection of a first non-display region according to an embodiment of the present disclosure.

FIG. 13 is a schematic view showing a projection structure of a first non-display region according to an embodiment of the present disclosure. In FIG. 13, the reference numeral 311 denotes the orthographic projection of the first electrode line onto the substrate 10, and the reference numeral 331 denotes the orthographic projection of the first connection line onto the substrate 10. The first electrode line and the first connection line in the first non-display region 121 are disposed in different layers. The orthographic projection 41 of at least part of the shielding signal line located in the first non-display region 121 onto the substrate 10 is located between the orthographic projection 331 of the first connection line onto the substrate 10 and the orthographic projection 311 of the first electrode line onto the substrate 10.

Figure 14:
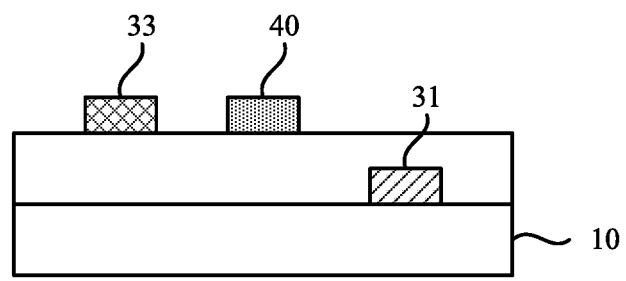
FIG. 14 is a sectional view taken along line D-D' in FIG. 13.

FIG. 14 is a sectional view taken along line D-D' of FIG. 13. According to FIG. 13 and FIG. 14, in the first non-display region 121, the orthographic projection 41 of a part of the shielding signal line 40 onto the substrate 10 is located is located between the orthographic projection 331 of the first connection line onto the substrate 10 and the orthographic projection 311 of the first electrode line onto the substrate 10, and this part of the shielding signal line 40 and the first connection line 33 may be disposed in the same layer. In this manner, in the first non-display region 121, this part of the shielding signal line 40 and the first connection line may be made of the same material and formed in the same process, so that part of process steps can be simplified and the cost can be reduced. In addition, the first connection line and the first electrode line are disposed in different layers, so that the width of the first display region is reduced and the size of the frame is reduced, and a narrow bezel is easy to be achieved.

Figure 15:
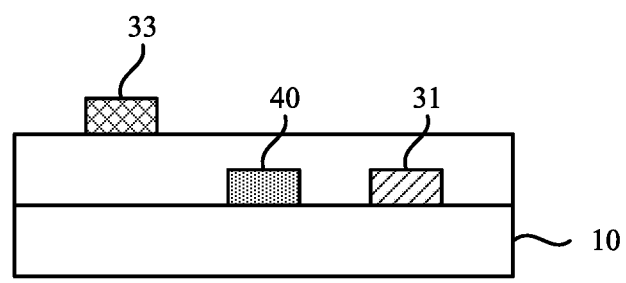
FIG. 15 is another sectional view taken along line D-D' in FIG. 13.

FIG. 15 is another sectional view taken along line D-D' of FIG. 13. According to FIG. 15 and FIG. 13, in the first non-display region 121, the orthographic projection 41 of at least part of the shielding signal line 40 onto the substrate 10 is located is located between the orthographic projection 331 of the first connection line 33 onto the substrate 10 and the orthographic projection 311 of the first electrode line 31 onto the substrate 10, and this part of the shielding signal line 40 and the first electrode line 31 may be disposed in the same layer. In this manner, in the first non-display region 121, this part of the shielding signal line 40 and the first electrode line 31 may be made of the same material and formed in the same process, so that part of process steps can be simplified and the cost can be reduced. In addition, the first connection line and the first electrode line are disposed in different layers, so that the width of the first display region is reduced and the size of the frame is reduced.

It should be noted that FIG. 14 and FIG. 15 are only exemplary drawings of the embodiment of the present disclosure, and an insulating layer is disposed between the first connection line 33 and the first electrode line 31 which are disposed in different layers. In the embodiment of the present disclosure, films between the first connection line 33 and the first electrode line 31, and the relationship among the film between the first connection line 33 and the first electrode line 31 may be designed according to an actual need, which are not specially limited in the embodiment of the present disclosure. In addition, the shielding signal line 40 may be disposed in the same layer as the first connection line 33 or the first electrode line 31, or may be disposed in a layer between the first connection line 33 and the first electrode line 31, which is not specially limited in the embodiment of the present disclosure.

In one embodiment, the shielding signal line located in the first non-display region includes a first shielding structure, a second shielding structure and a shielding overpass. The orthographic projection of the first shielding structure onto the substrate is located between the orthographic projection of the first connection line and the orthographic projection of the first electrode line; the second shielding structure is located on one side, far away from the first shielding structure, of the first connection line; and the first shielding structure and the second shielding structure are disposed in the same layer as the first connection line. The first shielding structure and the second shielding structure are connected to each other through the shielding overpass or shielding overpasses to form a U-shaped or ring-shaped structure. The shielding overpasses and the first connection line are disposed in different layers.

The embodiment, in which the first connection line and the first electrode line in the first non-display region are disposed in different layers and the shielding signal line surrounds or partially surrounds the first connection line is described below in conjunction with the drawings.

Figure 16:
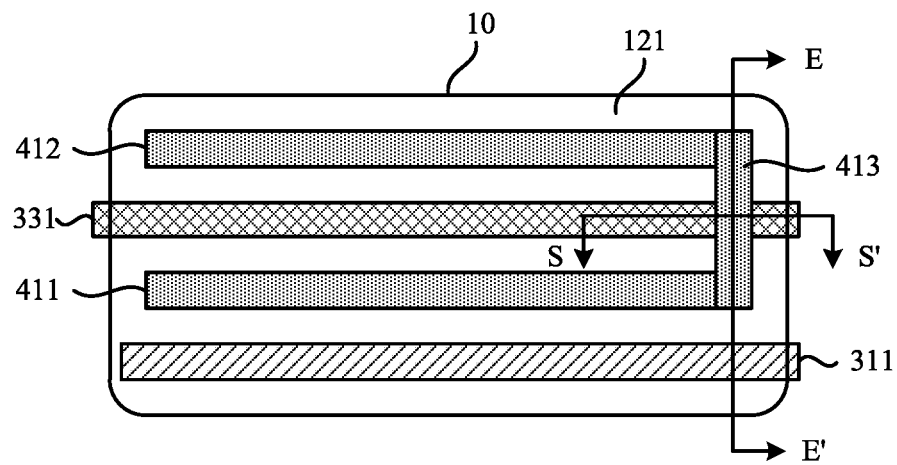
FIG. 16 is a schematic view showing a projection of another first non-display region according to an embodiment of the present disclosure.
Figure 17:
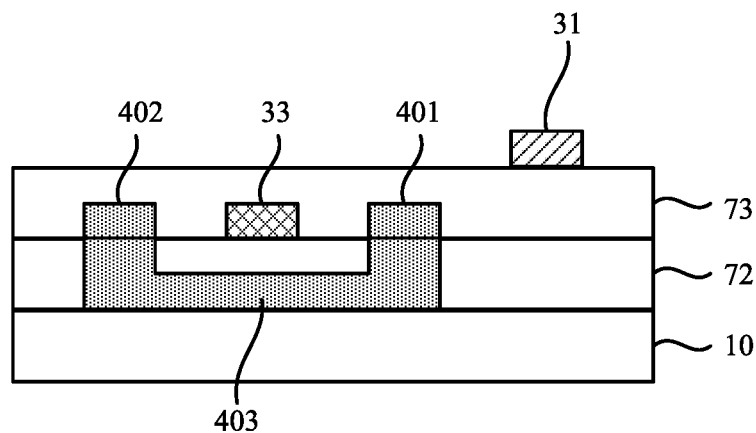
FIG. 17 is a sectional view taken along line E-E' in FIG. 16.

FIG. 16 is a top view showing the structure of another first non-display region according to an embodiment of the present disclosure. FIG. 17 is a sectional view taken along line E-E' of FIG. 16. According to FIG. 16 and FIG. 17, the shielding signal line in the first non-display region 121 includes a first shielding structure 401 (the reference numeral 411 in FIG. 16 denotes the orthographic projection of the first shielding structure 401 onto the substrate 10), a second shielding structure 402 (the reference numeral 412 in FIG. 16 denotes the orthographic projection of the second shielding structure 402 onto the substrate 10), and a shielding overpass 403 (the reference numeral 413 in FIG. 16 denotes the orthographic projection of the shielding overpass 403 onto the substrate 10). The orthographic projection 411 of the first shielding structure 401 onto the substrate 10 is located between the orthographic projection 331 of the first connection line 33 onto the substrate and the orthographic projection 311 of the first electrode line 31 onto the substrate 10. The second shielding structure 402 is located on one side, far away from the first shielding structure 401, of the first connection line 33. The first shielding structure 401 and the second shielding structure 402 are connected to each other through the shielding overpass 403 to form a U-shaped structure. The first shielding structure 401, the second shielding structure 402, and the first connection line 33 are disposed the same layer. The shielding overpass 403 and the first connection line 33 are disposed in different layers.

In this manner, the U-shaped structure of the shielding signal line partially surrounds the first connection line 33, so that first electrode line 31 and the first connection line 33 in the first non-display region 121 are isolated from each other along a direction perpendicular to the substrate 10. The first shielding structure 401 and the second shielding structure 402 of the U-shaped structure of the shielding signal line are located on two sides of the first connection line 33, so that the coupling effect between the second shielding structure 402 and the first connection line 33 is canceled through the coupling effect between the first shielding structure 401 and the first connection line 33, therefore improving the stability of signal transmission on the first connection line 33 and improving the touch detection precision and the touch sensitivity.

As shown in FIG. 17, when the shielding overpass 403 and the first connection line 33 are disposed in different layers, an insulating layer 72 may be disposed between the layer in which the shielding overpass 403 is disposed and the layer in which the first connection line 33 is disposed, and an insulating layer 73 may be disposed between the first electrode line 31 and the first connection line 33. In this embodiment, the shielding overpass 403, the first electrode line 31, and the first connection line 33 are disposed in three different layers respectively. The shielding overpass 403 may be connected to the first shielding structure 401 and the second shielding structure 402 through vias running through the insulating layer 71.

Figure 18:
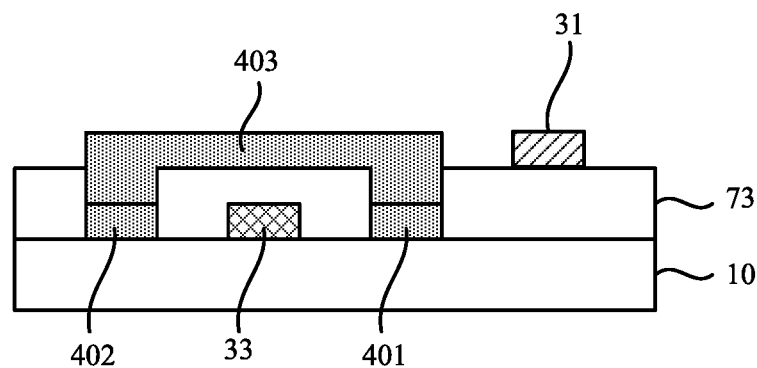
FIG. 18 is another sectional view taken along line E-E' in FIG. 16.

FIG. 18 is another sectional view taken along line E-E' of FIG. 16. The embodiment shown in FIG. 18 is different from the embodiment shown in FIG. 17. As shown in FIG. 18, the shield overpass 403 and the first connection line 33 are disposed in different layers, but the shield overpass 403 and the first electrode line 31 are disposed in the same layer. An insulating layer 73 may be disposed between the layer in which the shielding overpass 403 and the first electrode line 31 are disposed and the layer in which the first connection line 33 is disposed. The shielding overpass 403 is connected to the first shielding structure 401 and the second shielding structure 402 through vias penetrating the insulating layer 73. The shielding overpass 403 and the first electrode line 31 may be made of the same material and formed by the same procedure, so that manufacturing process steps is simplified and the cost is reduced.

Figure 19:
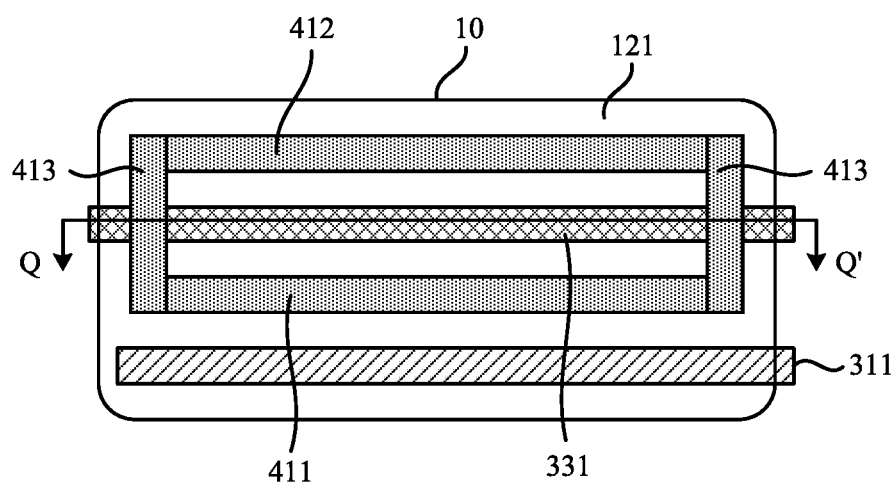
FIG. 19 is a schematic view showing a projection of another first non-display region according to an embodiment of the present disclosure.

FIG. 19 is a schematic view showing the projection of another first non-display region according to an embodiment of the present disclosure. The difference between the embodiment shown in FIG. 19 and the embodiment shown in FIG. 16 is that, as shown in FIG. 19, the first shielding structure 401 and the second shielding structure 402 are connected to each other through the shielding overpasses 403 to form a ring-shaped structure. For the same aspects of FIG. 19 and FIG. 16, please refer to the description of FIG. 16, FIG. 17 and FIG. 18, and no reception is made here.

In this manner, in the first non-display region 121, the ring-shaped structure of the shielding signal line surrounds the first connection line 33, and provides an electrostatic shielding structure, so that the first connection line 33 surrounded by the ring-shaped structure of the shielding signal line is isolated from the first electrode line 31 and other lines. In this way, the stability of signal transmission on the first connection line 33 is further improved, and the touch detection precision and the touch sensitivity are improved.

In one or more embodiments, in the first non-display region, the shielding signal line includes a first shielding structure, a second shielding structure and a shielding overpass. The orthographic projection of the first shielding structure onto the substrate is located between the orthographic projection of the first connection line onto the substrate and the orthographic projection of the first electrode line onto the substrate; the second shielding structure is located on one side, far away from the first shielding structure, of the first electrode line. The first shielding structure and the second shielding structure are disposed in the same layer as the first electrode line. The first shielding structure and the second shielding structure are connected to each other to form a U-shaped or ring-shaped structure. The shielding overpass and the first electrode line are disposed in different layers.

The embodiment in which the first connection line and the first electrode line are disposed in different layers in the first non-display region and the shielding signal line surrounds or partially surrounds the first electrode line is described below in conjunction with the drawings.

Figure 20:
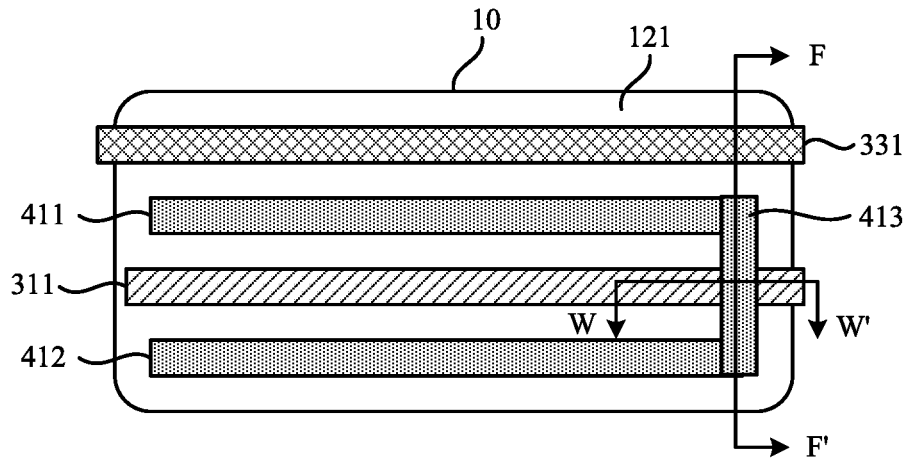
FIG. 20 is a schematic view showing a projection of another first non-display region according to an embodiment of the present disclosure.
Figure 21:
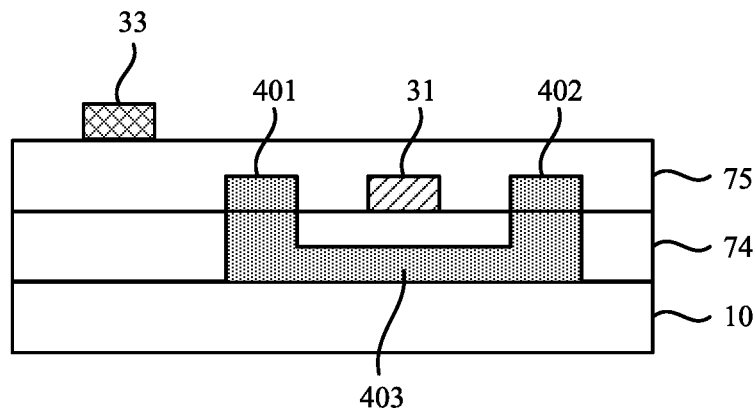
FIG. 21 is a sectional view taken along line F-F' in FIG. 20.

FIG. 20 is a schematic view showing the projection of another first non-display region according to an embodiment of the present disclosure. FIG. 21 is a sectional view taken along line F-F' of FIG. 20. According to FIG. 20 and FIG. 21, the shielding signal line in the first non-display region 121 includes a first shielding structure 401 (the reference numeral 411 in FIG. 20 denotes the orthographic projection of the first shielding structure 401 onto the substrate 10), a second shielding structure 402 (the reference numeral 412 in FIG. 20 denotes the orthographic projection of the second shielding structure 402 onto the substrate 10), and a shielding overpass 403 (the reference numeral 413 in FIG. 20 denotes the orthographic projection of the shielding overpass 403 onto the substrate 10). The orthographic projection 411 of the first shielding structure 401 onto the substrate 10 is located between the orthographic projection 331 of the first connection line 33 onto the substrate 10 and the orthographic projection 311 of the first electrode line 31 onto the substrate 10. The second shielding structure 402 is located on one side, far away from the first shielding structure 401, of the first electrode line 31. The first shielding structure 401 and the second shielding structure 402 are connected to each other through the shielding overpass 403 to form a U-shaped structure. The first shielding structure 401, the second shielding structure 402, and the first electrode line 31 are disposed the same layer. The shielding overpass 403 and the first electrode line 31 are disposed in different layers.

In this manner, the U-shaped structure of the shielding signal line partially surrounds the first connection line 33, so that first electrode line 31 and the first connection line 33 in the first non-display region 121 are isolated from each other along a direction perpendicular to the substrate 10. The first shielding structure 401 and the second shielding structure 402 of the U-shaped structure of the shielding signal line are located on two sides of the first connection line 31, so that the coupling effect between the second shielding structure 402 and the first electrode line 31 is canceled through the coupling effect between the first shielding structure 401 and the first electrode line 31, improving the stability of signal transmission on the first electrode line 31, the touch detection precision and the touch sensitivity.

As shown in FIG. 21, when the shielding overpass 403 and the first electrode line 31 are disposed in different layers, an insulating layer 74 is disposed between the layer in which the shielding overpass 403 is disposed and the layer in which the first electrode line 31 is disposed, and an insulating layer 75 is disposed between the first electrode line 31 and the first connection line 33. The shielding overpass 403, the first electrode line 31, and the first connection line 33 are disposed in three different layers respectively. The shielding overpass 403 may be connected to the first shielding structure 401 and the second shielding structure 402 through vias penetrating the insulating layer 74.

Figure 22:
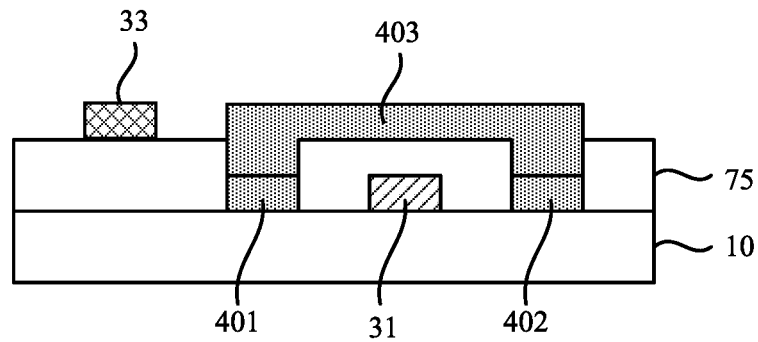
FIG. 22 is another sectional view taken along line F-F' in FIG. 19.

FIG. 22 is another sectional view taken along line F-F' of FIG. 19. The difference between the embodiment shown in FIG. 22 and the embodiment shown in FIG. 21 is that the shield overpass 403 and the first electrode line 31 are disposed in different layers, but the shield overpass 403 and the first connection line 33 are disposed in the same layer. An insulating layer 75 is disposed between the layer in which the shielding overpass 403 and the first connection line 33 are disposed, and the layer in which the first electrode line 31 is disposed. The shielding overpass 403 is connected to the first shielding structure 401 and the second shielding structure 402 through vias penetrating the insulating layer 75. The shielding overpass 403 and the first connection line 33 can be made of the same material and formed in the same procedure, so that the manufacturing process s can be simplified and the cost can be reduced.

Figure 23:
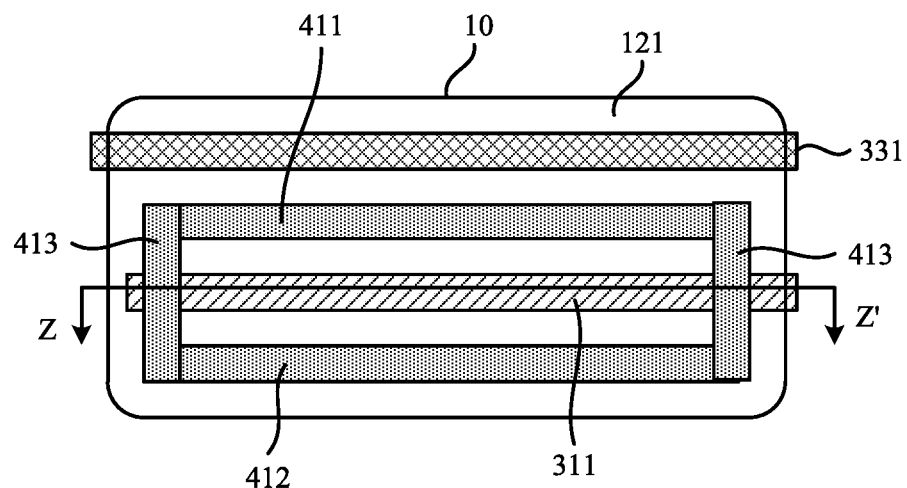
FIG. 23 is a schematic view showing a projection of another first non-display region according to an embodiment of the present disclosure.

FIG. 23 is a schematic view showing the projection of another first non-display region according to an embodiment of the present disclosure. The difference between the embodiment shown in FIG. 23 and the embodiment shown in FIG. 20 is that, as shown in FIG. 23, the first shielding structure 401 and the second shielding structure 402 are connected to each other through the shielding overpasses 403 to form a ring-shaped structure. For the same aspects of FIG. 23 and FIG. 20, please refer to the description of FIG. 20, FIG. 21 and FIG. 22, and no reception is made here.

In the first non-display region 121, the ring-shaped structure of the shielding signal line surrounds the first electrode line 31, and functions as an electrostatic shielding structure, so that the electrode line 31 surrounded by the ring-shaped structure of the shielding signal line is isolated from the first connection line 33 and other lines. In this way, the stability of signal transmission on the electrode line 31 is further improved, and the touch detection precision and the touch sensitivity are improved.

In one or more embodiments, the shielding signal line in the first non-display region includes a first shielding structure, a second shielding structure and one or more shielding overpasses. The first shielding structure and the second shielding structure are connected to each other through the shielding overpass to form a U-shaped or ring-shaped structure. The shielding signal line and the first connection line are disposed in the same layer; the orthographic projection of the first shielding structure onto the substrate is located between the orthographic projection of the first connection line onto the substrate and the orthographic projection of the first electrode line onto the substrate; and the second shielding structure is located on one side, far away from the first shielding structure, of the first electrode line. In one embodiment, the shielding signal line and the first electrode line are disposed in the same layer; the orthographic projection of the first shielding structure onto the substrate is located between the orthographic projection of the first connection line onto the substrate and the orthographic projection of the first electrode line onto the substrate; and the second shielding structure is located on one side, far away from the first shielding structure, of the first connection line.

The embodiment in which the shielding signal line and the first connection line are disposed in the same layer and the shielding signal line and the first electrode line are disposed in different layers is described below in conjunction with the drawings.

Figure 24:
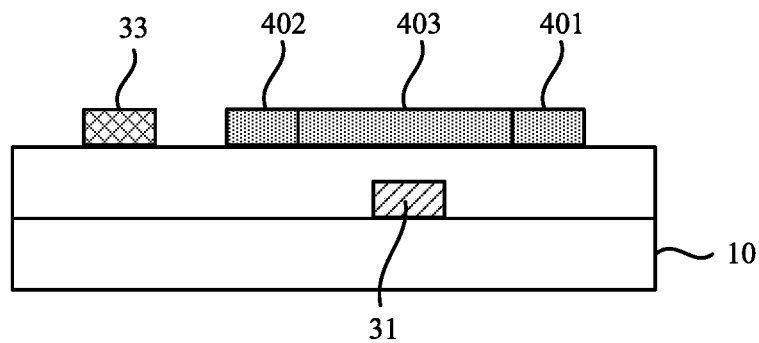
FIG. 24 is another sectional view taken along line F-F' in FIG. 20.

FIG. 24 is another sectional view taken along line F-F' of FIG. 20. According to FIG. 20 and FIG. 24, the shielding signal line located in the first non-display region 121 includes a first shielding structure 401 (the reference numeral 411 in FIG. 20 denotes the orthographic projection of the first shielding structure 401 onto the substrate 10), a second shielding structure 402 (the reference numeral 412 in FIG. 20 denotes the orthographic projection of the second shielding structure 402 onto the substrate 10), and a shielding connection line 403 (the reference numeral 413 in FIG. 20 denotes the orthographic projection of the shielding connection line 403 onto the substrate 10). The first shielding structure 401 and the second shielding structure 402 are connected to each other through the shielding connection line 403 to form a U-shaped structure. The first shielding structure 401, the second shielding structure 402, and the shielding connection line 403 are disposed in the same layer as the first connection line 33. The orthographic projection 411 of the first shielding structure 401 onto the substrate is located between the orthographic projection 331 of the first connection line 33 onto the substrate and the orthographic projection 311 of the first electrode line 31 onto the substrate; and the second shielding structure 402 is located on one side, far away from the first shielding structure 401, of the first electrode line 31.

In this manner, the first electrode line 31 is disposed in a different layer than the first connection line 33 and the shielding signal line, and the first shielding structure 401, the second shielding structure 402, and the shielding connection line 403 of the U-shaped structure partially surrounds the first electrode line 31, so that along a direction perpendicular to the substrate 10, the first electrode line 31 and the first connection line 33 in the first non-display region 121 are isolated from each other. In addition, along the direction perpendicular to the substrate 10, the first shielding structure 401 and the second shielding structure 402 of the U-shaped structure of the shielding signal line are located on two sides of the first electrode line 31, so that the coupling effect between the second shielding structure 402 and the first electrode line 31 is canceled through the coupling effect between the first shielding structure 401 and the electrode line 31, improving the stability of signal transmission on the first electrode line 31, the touch detection precision and the touch sensitivity.

As shown FIG. 23 and FIG. 24, the first shielding structure 401 and the second shielding structure 402 are connected to each other through the shielding connection line 403 to form a ring-shaped structure. The first electrode line 31 is disposed in a layer different from the layer where the first connection line 33 and the shielding signal line are disposed, and the ring-shaped structure of the shielding signal line surrounds the first electrode line 31. Along the direction perpendicular to the substrate 10, the ring-shaped structure of the shielding signal line functions as an electrostatic shielding structure. Along the direction perpendicular to the substrate 10, the first electrode line 31 surrounded by the ring-shaped structure of the shielding signal line is isolated from the first connection line 33 and other lines. Therefore, the stability of signal transmission on the first electrode line 31 is further improved, and the touch detection precision and the touch sensitivity are improved.

The embodiment in which the shielding signal line and the first electrode line are disposed in the same layer, and the shielding signal line and the first connection line are disposed in different layers is described below in conjunction with the drawings.

Figure 25:
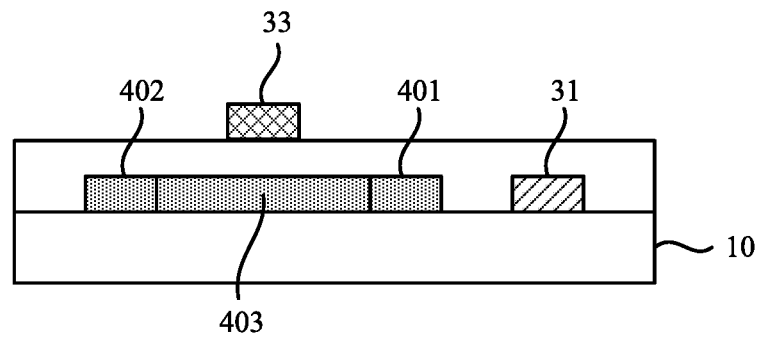
FIG. 25 is another sectional view taken along line E-E' in FIG. 16.

FIG. 25 is another sectional view taken along line E-E' of FIG. 16. According to FIG. 16 and FIG. 25, the shielding signal line located in the first non-display region 121 includes a first shielding structure 401 (the reference numeral 411 in FIG. 20 denotes the orthographic projection of the first shielding structure 401 onto the substrate 10), a second shielding structure 402 (the reference numeral 412 in FIG. 20 denotes the orthographic projection of the second shielding structure 402 onto the substrate 10), and a shielding connection line 403 (the reference numeral 413 in FIG. 20 denotes the orthographic projection of the shielding connection line 403 onto the substrate 10). The first shielding structure 401 and the second shielding structure 402 are connected to each other through the shielding connection line 403 to form a U-shaped structure. The shielding signal line and the first electrode line 31 of the touch display panel are disposed in the same layer. The orthographic projection 411 of the first shielding structure 401 onto the substrate is located between the orthographic projection 331 of the first connection line 33 onto the substrate and the orthographic projection 311 of the first electrode line 31 onto the substrate. The second shielding structure 402 is located on one side, far away from the first shielding structure 401, of the first connection line 33.

In this manner, that first connection line 33 is disposed in a layer different from the layer where the first electrode line 31 and the shielding signal line are disposed, and the U-shaped structure of the shielding signal line partially surrounds the first connection line 33, so that along a direction perpendicular to the substrate 10, the first electrode line 31 and the first connection line 33 in the first non-display region 121 are isolated from each other. Along the direction perpendicular to the substrate 10, the first shielding structure 401 and the second shielding structure 402 of the U-shaped structure of the shielding signal line are located on two sides of the first connection line 33, so that the coupling effect between the second shielding structure 402 and the first connection line 33 is canceled through the coupling effect between the first shielding structure 401 and the first connection line 33, and therefore the stability of signal transmission on the first connection line 33 is further improved; and the touch detection precision and the touch sensitivity are improved.

As shown in FIG. 16 and FIG. 25, the first shielding structure 401 and the second shielding structure 402 are connected to each other through the shielding connection lines 403 to form a ring-shaped structure. In this manner, that first connection line 33 is disposed in a layer different from the layer where the first electrode line 31 and the shielding signal line are disposed, and the ring-shaped structure of the shielding signal line surrounds the first connection line 33, so that along the direction perpendicular to the substrate 10, the ring-shaped structure of the shielding signal line functions as an electrostatic shielding structure. Along the direction perpendicular to the substrate 10, the first connection line 33 surrounded by the ring-shaped structure of the shielding signal line is isolated from the first electrode line 31 and other lines. Therefore, the stability of signal transmission on the first connection line 33 is further improved, and the touch detection precision and the touch sensitivity are improved.

In the above embodiments, the first electrode line and the first connection line in the first non-display region are disposed in the same layer or disposed in different layers. In other embodiments, a part of the first electrode line is disposed in the same layer as the first connection line, and another part of the first electrode line is disposed in a different layer.

In one or more embodiments, the first electrode line, the shielding signal line and the first connection line located in the first non-display region are insulated from each other, and the first connection line and at least part of the first electrode line are disposed in different layers. The shielding signal line includes a first shielding structure, a second shielding structure and a shielding connection line, and the first shielding structure and the second shielding structure are connected to each other through the shielding connection line to form a U-shaped or ring-shaped structure. The first shielding structure, the second shielding structure and the shielding connection line are disposed in the same layer. The first shielding structure is located between the first connection line and the first electrode line, and the second shielding structure is located on one side, far away from the first shielding structure, of the first connection line or the first electrode line. The orthographic projection of the shielding connection line onto the substrate overlaps the orthographic projection of the first electrode line onto the substrate, or the orthographic projection of the first connection line onto the substrate.

The embodiment in which a part of the first connection line is disposed in the same layer as the first electrode line and another part of the first connection line is disposed in a different layer is described below in conjunction with the drawings.

Figure 26:
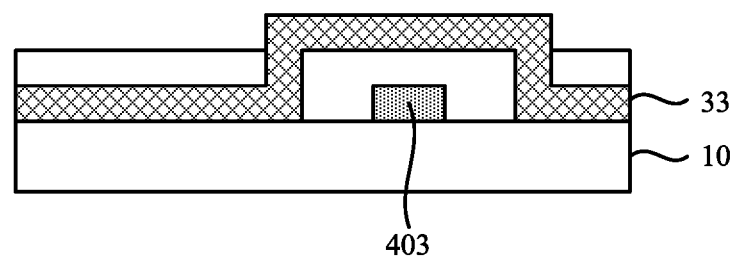
FIG. 26 is a sectional view taken along line S-S' in FIG. 16.

FIG. 26 is an exemplary sectional view taken along line S-S' of FIG. 16. According to FIG. 16 and FIG. 26, the shielding signal line in the first non-display region 121 includes the first shielding structure 401 (the reference numeral 411 in FIG. 16 denotes the orthographic projection of the first shielding structure 401 onto the substrate 10), the second shielding structure 402 (the reference numeral 412 in FIG. 16 denotes the orthographic projection of the second shielding structure 402 onto the substrate 10), and the shielding connection line 403 (the reference numeral 413 in FIG. 16 denotes the orthographic projection of the shielding connection line 403 onto the substrate 10). The first shielding structure and the second shielding structure are connected to each other through the shielding connection line 403 to form a U-shaped structure. The first shielding structure is located between the first connection line 33 and the first electrode line 31. The second shielding structure is located on one side, far away from the first shielding structure, of the first connection line 33. The orthographic projection 413 of the shielding connection line 403 onto the substrate 10 overlaps the orthographic projection 331 of the first connection line 33 onto the substrate 10.

The first electrode line 31, the shielding signal line and the first connection line 33 in the first non-display region 121 are insulated from each other. At least one part of the first electrode line 31 is disposed in a layer different from the layer where the first connection line 33 is disposed, and the first shielding structure, the second shielding structure and the shielding connection line 403 are disposed in the same layer. Therefore, the first connection line 33 has a part disposed in another layer at the overlapping part of the orthographic projection 413 of the shielding connection line 403 onto the substrate 10 and the orthographic projection 331 of the first connection line 33 onto the substrate 10. That is, the first connection line 33 and the shielding signal line at the overlapping region are disposed in different layers, so that the first connection line 33 and the shielding signal line are electrically insulated.

Figure 27:
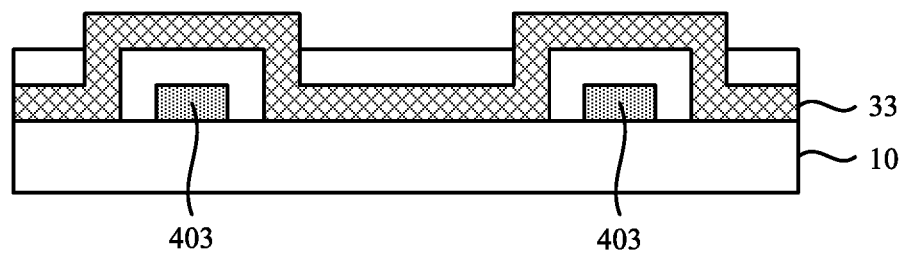
FIG. 27 is a sectional view taken along line Q-Q' in FIG. 19.

FIG. 27 is an exemplary sectional view taken along line Q-Q' of FIG. 19. As shown in FIG. 19 and FIG. 27, the difference between the embodiment shown in FIG. 27 and the embodiment shown in FIG. 26 is that the first shielding structure and the second shielding structure are connected to each other through the shielding connection lines 403 to form a ring-shaped structure, and the first connection line 33 has a part disposed in another layer at the overlapping region between the ring-shaped structure of the shielding signal line and the first connection line 33, that is, the first connection line 33 and the shielding signal line are disposed in different layers at the overlapping region, so that the first connection line 33 and the shielding signal line are electrically connected.

Figure 28:
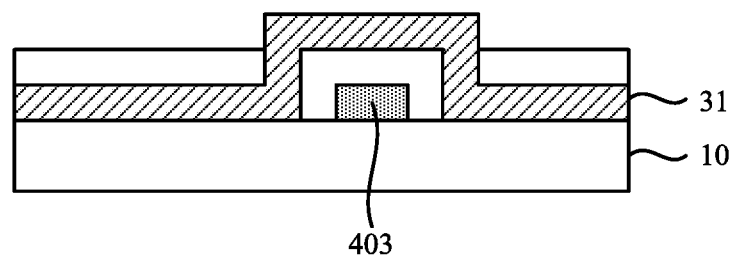
FIG. 28 is a sectional view taken along line W-W' in FIG. 20.

FIG. 28 is an exemplary sectional view taken along line W-W' of FIG. 20. As shown in FIG. 20 and FIG. 28, the shielding signal line in the first non-display region 121 includes the first shielding structure (the reference numeral 411 in FIG. 20 denotes the orthographic projection of the first shielding structure 401 onto the substrate 10), the second shielding structure (the reference numeral 412 in FIG. 20 denotes the orthographic projection of the second shielding structure 402 onto the substrate 10), and the shielding connection line 403 (the reference numeral 413 in FIG. 20 denotes the orthographic projection of the shielding connection line 403 onto the substrate 10). The first shielding structure and the second shielding structure are connected to each other through the shielding connection line 403 to form a U-shaped structure. The first shielding structure is located between the first connection line 33 and the first electrode line 31, and the second shielding structure is located on one side, far away from the first shielding structure, of the first electrode line 31. The orthographic projection 413 of the shielding connection line 403 onto the substrate 10 overlaps the orthographic projection 311 of the first electrode line 31 onto the substrate 10.

The first electrode line 31, the shielding signal line and the first connection line 33 in the first non-display region 121 are insulated from each other. The first electrode line 31 has at least one part disposed in a layer different from the layer where the first connection line 33 is disposed. The first shielding structure, the second shielding structure and the shielding connection line 403 are disposed in the same layer. Therefore, the first electrode line 31 can jumps to another layer at the overlapping region between the orthographic projection 413 of the shielding connection line 403 onto the substrate 10 and the orthographic projection 311 of the first electrode line 31 onto the substrate 10. That is, the first electrode line 31 and the shielding signal line at the overlapping region are disposed in different layers, so that the first electrode line 31 and the shielding signal line are electrically insulated.

Figure 29:
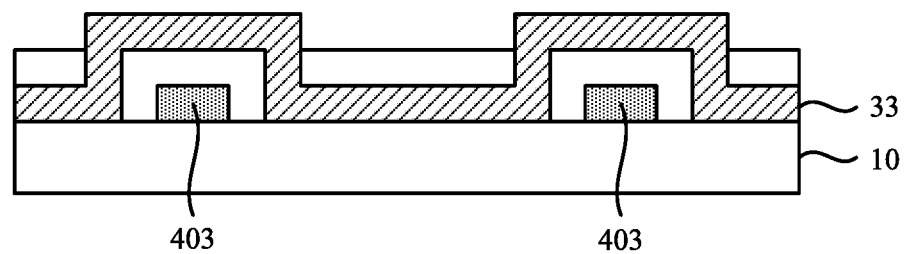
FIG. 29 is a sectional view taken along line Z-Z' in FIG. 23.

FIG. 29 is an exemplary sectional view taken along line Z-Z' of FIG. 23. As shown in FIG. 23 and FIG. 29, the difference between the embodiment shown in FIG. 29 and the embodiment shown in FIG. 28 is that the first shielding structure and the second shielding structure are connected to each other through the shielding connection lines 403 to form a ring-shaped structure, and the first electrode line 31 jumps at the overlapping regions between the ring-shaped structure of the shielding signal line and the first electrode line 31, that is, the first electrode line 31 and the shielding signal line at the overlapping region are disposed in different layers, so that the first electrode line 31 and the shielding signal line are electrically insulated.

Figure 30:
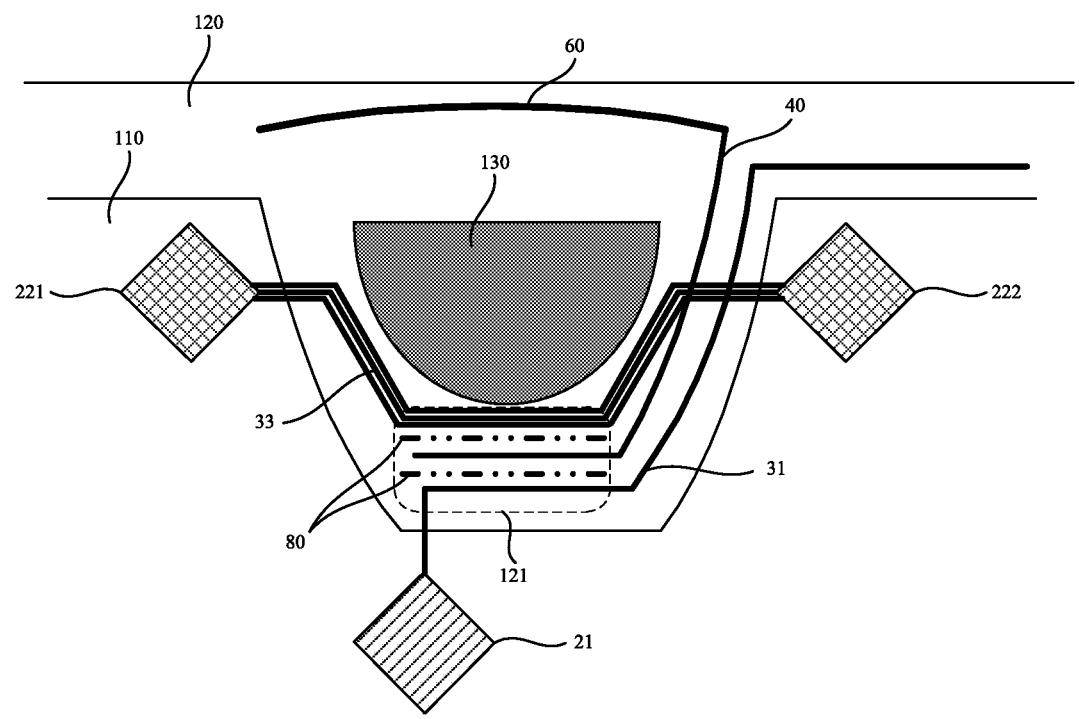
FIG. 30 is a schematic view showing a partial region in another touch display panel according to an embodiment of the present disclosure.

FIG. 30 is a schematic view showing a partial region in another touch display panel according to an embodiment of the present disclosure. As shown in FIG. 30, the first connection line 33 includes at least two first connection sub-lines. Correspondingly, the first touch sub-electrode 221 and the second touch sub-electrode 222 on two sides of the notch 130 are connected through the at least two first connection sub-lines.

In this manner, the cross-sectional area of the first connection line 33 including at least two first connection sub-lines is larger than the cross-sectional area of the first connection line including only one first connection sub-line. The resistance of the first connection line 33 can be calculated according to the formula $R=\rho l/S$, where $\rho$ notes the resistivity of the first connection line 33, l notes the length of the first connection line 33, and S notes the cross-sectional area of the first connection line 33. When both $\rho$ and l are fixed, the resistance of the first connection line 33 can be reduced by increasing the cross-sectional area of the first connection line 33, so that the transmission loss of the signal transmitted on the first connection line 33 can be reduced.

With continued reference to FIG. 30, the touch display panel further includes a dummy line 80. When the shielding signal line 40 and the first electrode line 31 in the first non-display region 121 are disposed in the same layer, the dummy line 80 is located between the shielding signal line 40 and the first electrode line 31; and/or the dummy line 80 is located between any two adjacent first electrode lines 31. In one embodiment, when the shielding signal line 40 and the first connection line 33 in the first non-display region 121 are disposed in the same layer, the dummy line 80 is located between the shielding signal line 40 and the first connection line 33; and/or the dummy line 80 is located between any two adjacent first connection lines. It should be noted that the dotted line in the drawings is used to represent the dummy line 80, but does not indicate that the dummy line breaks. The dotted line in the drawings is adopted for the convenience of the distinction from other lines, which is not limited in the present disclosure and may be specifically set according to circumstances.

The lines in the first non-display region 121 are typically formed by patterning process. Since the first non-display region 121 has a relative small size and the lines in the first non-display region 121 are dense, over-etching or under-etching is easy to occur, which causes the line widths of the first electrode lines 31 and/or first connection lines 33 to be inconsistent, so that the signals transmitted on the first electrode lines 31 and/or the first connection lines 33 are different, and the touch detection precision and the touch sensitivity are influenced.

The dummy line 80 is disposed between lines in the first non-display region 121. In one embodiment, the dummy line 80 is disposed between the first electrode line 31 and the shielding signal line 40, and/or between tow first electrode lines 31; and/or between the first connection line 33 and the shielding signal line 40, and/or between two first connection lines 33, so that the over-etching or under-etching phenomenon is prevented, ensuring a uniform width of each the first electrode line 31 and/or each first connection line 33.

It should be noted that, in order to better distinguish the shielding signal line 40, the first electrode line 31, the first connection line 33 and the virtual line 80, a dotted line is used to represent the shielding signal line 40 and another dotted line is used to represent the virtual line 80, which do not indicate that the shielding signal line 40 and the virtual line 80 are discontinuous.

Figure 31:
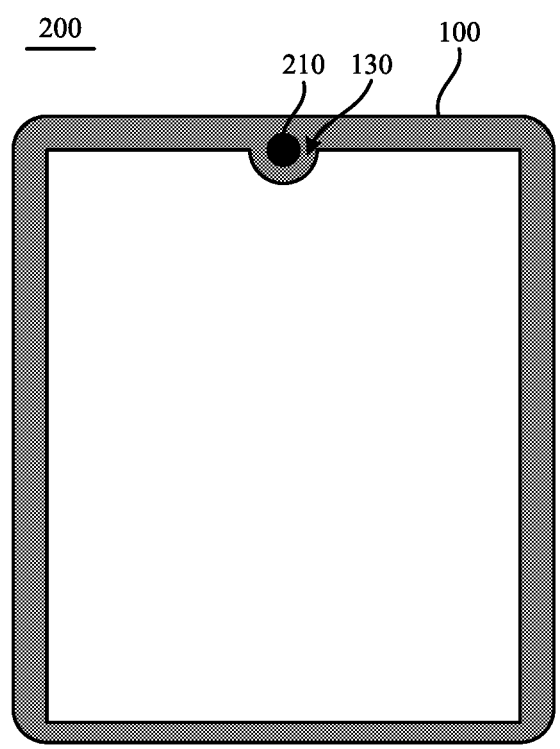
FIG. 31 is a schematic view of a display device according to an embodiment of the present disclosure.

Based on the same concept, a display device is provided according to an embodiment of the present disclosure. FIG. 31 is a schematic view of the display device according to the embodiment of the present disclosure. With reference to FIG. 31, the display device 200 may include the display panel 100 described in any one of the embodiments of the present disclosure. The display device may be a mobile phone 200 as shown in FIG. 31, may be a computer, a television, an intelligent wearable display device and the like, and is not specifically limited in the embodiment of the present disclosure.

What is claimed is:

1. A touch display panel, comprising: a display region and a non-display region surrounding the display region;
    a notch, located at an edge of the display region and extending towards an inside of the display region;
    a substrate; and
    a touch structure, located on one side of the substrate,
    wherein the touch structure comprises a plurality of first touch electrodes and a plurality of second touch electrodes, the plurality of first touch electrodes extend along a first direction and are arranged along a second direction, the plurality of second touch electrodes extend along the second direction and are arranged along the first direction, and the first direction intersects the second direction;
    wherein at least one of the plurality of second touch electrodes comprises a first touch sub-electrode and a second touch sub-electrode located on a first and second side of the notch along the second direction;
    wherein the non-display region comprises a first non-display region adjacent to the notch;
    wherein the first touch sub-electrode is connected to the second touch sub-electrode through a first connection line, and at least one part of the first connection line is located in the first non-display region;
    wherein one of the plurality of first touch electrodes is electrically connected to a driving chip through a first electrode line, and at least part one of the first electrode line is located in the first non-display region; and
    wherein the touch display panel further comprises a shielding signal line, and an orthographic projection of the at least one part of the shielding signal line in the first non-display region onto the substrate is located between an orthographic projection of the first connection line onto the substrate and an orthographic projection of the first electrode line onto the substrate.

2. The touch display panel according to claim 1, wherein the one of the first plurality of the touch electrodes electrically connected to the first electrode line in the first non-display region is located on a straight line, and the straight line extends through the notch.

3. The touch display panel according to claim 1, wherein in the first non-display region, the orthographic projection of the first connection line onto the substrate does not overlap the orthographic projection of the first electrode line onto the substrate.

4. The touch display panel according to claim 3, wherein the first electrode line and the first connection line in the first non-display region do not overlap and are disposed in a same layer;
    wherein the at least one part of the shielding signal line located in the first non-display region is located between the first connection line and the first electrode line.

5. The touch display panel according to claim 4, wherein the shielding signal line located in the first non-display region comprises a first shielding structure, a second shielding structure and a shielding overpass;
    wherein the first shielding structure is located between the first connection line and the first electrode line, the second shielding structure is located on the first side, far away from the first shielding structure, of the first connection line or the first electrode line, and the first shielding structure, the second shielding structure, the first connection line and the first electrode line are disposed in a same layer; and
    wherein the first shielding structure and the second shielding structure are connected to each other through the shielding overpass to form a U-shaped or ring-shaped structure, and the shielding overpass is disposed in a layer different from the layer where the first connection line and the first electrode line are disposed.

6. The touch display panel according to claim 3, wherein the first electrode line and the first connection line in the first non-display region are disposed in different layers; and
    wherein an orthographic projection of the at least one part of the shielding signal line located in the first non-display region onto the substrate is located between the orthographic projection of the first connection line onto the substrate and the orthographic projection of the first electrode line onto the substrate.

7. The touch display panel according to claim 6, wherein the shielding signal line in the first non-display region comprises a first shielding structure, a second shielding structure and a shielding overpass;
    wherein an orthographic projection of the first shielding structure onto the substrate is located between the orthographic projection of the first connection line onto the substrate and the orthographic projection of the first electrode line onto the substrate, the second shielding structure is located on the second side, far away from the first shielding structure, of the first connection line, and the first shielding structure, the second shielding structure and the first connection line are disposed in a same layer; and
    wherein the first shielding structure and the second shielding structure are connected to each other through the shielding overpass to form a U-shaped or ring-shaped structure, and the shielding overpass and the first connection line are disposed in different layers.

8. The touch display panel according to claim 7, wherein the shielding overpass and the first electrode line are disposed in a same layer.

9. The touch display panel according to claim 6, wherein the shielding signal line in the first non-display region comprises a first shielding structure, a second shielding structure and a shielding overpass;
wherein an orthographic projection of the first shielding structure onto the substrate is located between the orthographic projection of the first connection line onto the substrate and the orthographic projection of the first electrode line onto the substrate, the second shielding structure is located on the first side, far away from the first shielding structure, of the first electrode line, and the first shielding structure, the second shielding structure and the first electrode line are disposed in a same layer; and
wherein the first shielding structure and the second shielding structure are connected to each other through the shielding overpass to form a U-shaped or ring-shaped structure, and the shielding overpass and the first electrode line are disposed in different layers.

10. The touch display panel according to claim 9, wherein the shielding overpass and the first connection line are disposed in a same layer.

11. The touch display panel according to claim 6, wherein the shielding signal line in the first non-display region comprises a first shielding structure, a second shielding structure and a shielding connection line, wherein the first shielding structure and the second shielding structure are connected to each other through the shielding connection line to form a U-shaped or ring-shaped structure;
wherein the shielding signal line and the first connection line are disposed in a same layer, an orthographic projection of the first shielding structure onto the substrate is located between the orthographic projection of the first connection line onto the substrate and the orthographic projection of the first electrode line onto the substrate, and the second shielding structure is located on the second side, far away from the first shielding structure, of the first electrode line.

12. The touch display panel according to claim 6, wherein the shielding signal line in the first non-display region comprises a first shielding structure, a second shielding structure and a shielding connection line, wherein the first shielding structure and the second shielding structure are connected to each other through the shielding connection line to form a U-shaped or ring-shaped structure;
wherein the shielding signal line and the first electrode line are disposed in a same layer, an orthographic projection of the first shielding structure onto the substrate is located between the orthographic projection of the first connection line onto the substrate and the orthographic projection of the first electrode line onto the substrate, and the second shielding structure is located on the first side, far away from the first shielding structure, of the first connection line.

13. The touch display panel according to claim 3, wherein the first electrode line, the shielding signal line and the first connection line in the first non-display region are insulated from each other, and the first connection line and at least one part of the first electrode line are disposed in different layers;
wherein the shielding signal line comprises a first shielding structure, a second shielding structure and a shielding connection line, the first shielding structure and the second shielding structure are connected to each other through the shielding connection line to form a U-shaped or ring-shaped structure, and the first shielding structure, the second shielding structure and the shielding connection line are disposed in a same layer; and
wherein the first shielding structure is located between the first connection line and the first electrode line, the second shielding structure is located on the second side, far away from the first shielding structure, of the first connection line or the first electrode line, and an orthographic projection of the shielding connection line onto the substrate overlaps the orthographic projection of the first electrode line onto the substrate or the orthographic projection of the first connection line onto the substrate.

14. The touch display panel according to claim 1, wherein the shielding signal line receives a fixed potential.

15. The touch display panel according to claim 1, wherein the first connection line comprises at least two first connection sub-lines; and
wherein the first touch sub-electrode is connected to the second touch sub-electrode through the at least two first connection sub-lines.

16. The touch display panel according to claim 1, further comprising a dummy line;
wherein the shielding signal line and the at least one part of the first electrode line located in the first non-display region are disposed in a same layer, and the dummy line is located between the shielding signal line and the first electrode line.

17. The touch display panel according to claim 1, further comprising a dummy line, wherein the dummy line is located between two adjacent first electrode lines.

18. The touch display panel according to claim 1, further comprising a dummy line, wherein the shielding signal line and the at least one part of the first connection line located in the first non-display region are disposed in a same layer, and the dummy line is located between the shielding signal line and the first connection line.

19. The touch display panel according to claim 1, further comprising a dummy line, wherein the dummy line is located between two adjacent first connection lines.

20. A display device, comprising a touch display panel, wherein the touch display panel comprises:
a notch, located at an edge of the display region and extending towards an inside of the display region;
a substrate; and
a touch structure, located on one side of the substrate,
wherein the touch structure comprises a plurality of first touch electrodes and a plurality of second touch electrodes, the plurality of first touch electrodes extend along a first direction and are arranged along a second direction, the plurality of second touch electrodes extend along the second direction and are arranged along the first direction, and the first direction intersects the second direction;
wherein at least one of the plurality of second touch electrodes comprises a first touch sub-electrode and a second touch sub-electrode located on a first and second side of the notch along the second direction;
wherein the non-display region comprises a first non-display region adjacent to the notch;
wherein the first touch sub-electrode is connected to the second touch sub-electrode through a first connection line, and at least one part of the first connection line is located in the first non-display region;
wherein the first touch electrode is electrically connected to a driving chip through a first electrode line, and at least part one of the first electrode line is located in the first non-display region; and wherein the touch display panel further comprises a shielding signal line, and an orthographic projection of the at least one part of the shielding signal line in the first non-display region onto the substrate is located between an orthographic projection of the first connection line onto the substrate and an orthographic projection of the first electrode line onto the substrate.

* * * * *